(12) United States Patent
Collins et al.

(10) Patent No.: US 10,543,148 B1
(45) Date of Patent: Jan. 28, 2020

(54) INTEGRATED MANIFOLD AND VALVE ASSEMBLY

(71) Applicant: WEXCO INCORPORATED, York, PA (US)

(72) Inventors: Samuel Jeffery Collins, Dallas, OR (US); Scott Stephen Backer, Albany, OR (US)

(73) Assignee: WEXCO INCORPORATED, York, PA (US)

( * ) Notice: Subject to any disclaimer, the term of this patent is extended or adjusted under 35 U.S.C. 154(b) by 0 days.

(21) Appl. No.: 16/511,409

(22) Filed: Jul. 15, 2019

(51) Int. Cl.
  *A61H 33/00* (2006.01)
  *A61H 33/02* (2006.01)
  (Continued)

(52) U.S. Cl.
  CPC ..... *A61H 33/6057* (2013.01); *A61H 33/0087* (2013.01); *A61H 33/02* (2013.01); *A61H 33/601* (2013.01); *A61H 33/6005* (2013.01); *A61H 33/6021* (2013.01); *A61H 33/6036* (2013.01); *A61H 33/6052* (2013.01);
  (Continued)

(58) Field of Classification Search
  CPC ............ A61H 33/6063; A61H 33/6052; A61H 2033/023; A61H 2033/022; A61H 2033/021; A61H 33/0087; A61H 33/60; A61H 33/601; A61H 33/6021; A61H 33/00; A61H 33/6057; A61H 33/6005; F16K 11/052; F16K 11/0525; F16K 1/20; Y10T 137/86863; Y10T 137/87812; Y10T 137/8782; Y10T 137/87909; Y10T 137/86533
  See application file for complete search history.

(56) References Cited

U.S. PATENT DOCUMENTS 3,166,499 A * 1/1965 Rudelick ............... B01F 1/0016
                                                   210/136
3,913,187 A   10/1975 Okuda
                     (Continued)

FOREIGN PATENT DOCUMENTS

DE    202012104309 U1   2/2014
WO      96/17576 A1    6/1996

OTHER PUBLICATIONS

Intellectual Property Office, Combined Search and Examination Report, in UK Patent Application No. GB19037472, dated Sep. 20, 2019, which is a foreign application of this applicant.

*Primary Examiner* — Atif H Chaudry
(74) *Attorney, Agent, or Firm* — Kolitch Romano LLP

(57) ABSTRACT

An integrated valve and manifold assembly includes a water valve configured to control water flow from one or two valve outlets. At least one of the outlets is coupled to a manifold. In some examples, the manifold is a dual-extrusion manifold having at least one air channel and at least one water conduit, and the water valve has a pair of air channels attached to a periphery of the water valve and configured to couple to the manifold air channels. In examples wherein at least one of the manifolds is a dual-extrusion manifold, a top portion of the assembly includes an air valve configured to control flow of air to air channel(s) of the dual-extrusion manifold. In other examples, the assembly includes a one-outlet or two-outlet water valve configured to couple to water manifolds, with no attached air channels or air valves.

13 Claims, 16 Drawing Sheets

(51) Int. Cl.
*F16K 1/20* (2006.01)
*F16K 11/052* (2006.01)
*F16K 11/085* (2006.01)
*F16L 41/03* (2006.01)

(52) U.S. Cl.
CPC ........... *A61H 33/6068* (2013.01); *F16K 1/20* (2013.01); *F16K 11/0525* (2013.01); *F16K 11/0856* (2013.01); *F16L 41/03* (2013.01); *A61H 2033/021* (2013.01); *A61H 2033/022* (2013.01); *A61H 2033/023* (2013.01); *Y10T 137/86533* (2015.04); *Y10T 137/86863* (2015.04); *Y10T 137/8782* (2015.04); *Y10T 137/87812* (2015.04); *Y10T 137/87909* (2015.04)

(56) References Cited

U.S. PATENT DOCUMENTS

| | | | |
|---|---|---|---|
| 3,925,851 A | 12/1975 | Bevans | |
| 3,981,048 A | 9/1976 | Moody et al. | |
| 4,055,151 A * | 10/1977 | Cummings | F16K 11/0525 122/7 B |
| 4,086,937 A | 5/1978 | Hechler, IV | |
| 4,420,846 A * | 12/1983 | Bonner | A61H 33/0087 261/DIG. 75 |
| 4,672,692 A | 6/1987 | Savage | |
| 5,197,459 A | 3/1993 | Henkin et al. | |
| 5,474,102 A | 12/1995 | Lopez | |
| 5,754,989 A | 5/1998 | Ludlow | |
| 5,809,648 A | 9/1998 | Kurth et al. | |
| 5,850,640 A | 12/1998 | Pinciaro | |
| 5,987,663 A * | 11/1999 | Ludlow | A61H 33/027 4/541.1 |
| 6,279,177 B1 | 8/2001 | Gloodt | |
| 6,543,067 B2 | 4/2003 | Eddington et al. | |
| 6,745,413 B2 | 6/2004 | Pinciaro | |
| 2003/0024041 A1* | 2/2003 | Eddington | A61H 33/6063 4/541.1 |
| 2004/0025245 A1 | 2/2004 | Pinciaro | |
| 2007/0067900 A1 | 3/2007 | Moretto | |
| 2007/0094784 A1* | 5/2007 | Tran | A61H 33/028 4/541.5 |
| 2008/0000020 A1 | 1/2008 | Romano | |
| 2008/0209627 A1 | 9/2008 | Geddes et al. | |
| 2008/0210785 A1 | 9/2008 | Hou et al. | |
| 2010/0064429 A1 | 3/2010 | Strickland | |
| 2012/0144579 A1 | 6/2012 | Fabian | |
| 2014/0001748 A1 | 1/2014 | Ignaczak et al. | |
| 2014/0101914 A1 | 4/2014 | Harder | |

\* cited by examiner

INTEGRATED MANIFOLD AND VALVE ASSEMBLY

FIELD

This disclosure relates to systems and methods for providing water and/or air to hot tubs, spa, and personal therapy systems. More specifically, the disclosed embodiments relate to integrated manifold and valve assemblies.

INTRODUCTION

A hot tub or spa typically includes a plumbing system configured to provide water and air to a pool of water contained within a shell or other structure suitable for containing water. The plumbing system transports water and air from respective sources to a plurality of jets each configured to deliver a mixture of air and water into the pool. Conventional plumbing systems include a plurality of air manifolds and water manifolds each coupled to a subset of the jets. Flow of air and water to the manifolds is typically controllable by one or more valves of the plumbing system. For example, one-outlet valves (also called one-way valves) may be configured to vary amounts of air provided to one or more air manifolds. One-outlet valves may also be used in the water system to vary amounts of water flowing to one or more manifolds. Alternatively, or additionally, multiple-outlet valves may be configured to partially or completely divert water from one subset of water manifolds to another.

Conventional hot tub plumbing systems such as those described above require many pipes and hose fittings to connect air and water manifolds to jets, to connect valves to the manifolds, and to connect the air and water supply systems to the valves. The layout of the system is in some cases further constrained by the need to position valve controls adjacent a top side of the shell, where they will be accessible to users. As a result, conventional systems typically include many potential failure points, are difficult to install, and occupy a large volume of space. Accommodating the plumbing system within the shell may require a hydraulically inefficient hose layout (including, e.g., multiple fittings, long lengths of hose, and many curves or turns in the hose), and may constrain the design of the shell itself. Better solutions are needed for providing water and/or air to hot tubs.

SUMMARY

The present disclosure provides systems, apparatuses, and methods relating to integrated valve and manifold assemblies.

In some embodiments, an integrated valve and manifold assembly for a hot tub comprises a water valve including a water valve body having a water inlet and two water outlets, and a pair of air channels attached to the water valve body; a pair of dual-extrusion manifolds coupled to the water valve, each dual-extrusion manifold having a pair of manifold air channels each coupled to one of the air channels attached to the water valve body, and a water conduit coupled to one of the water outlets of the water valve body; and an assembly top comprising an air valve having an air inlet and an air outlet, and an air coupler coupling the air outlet to at least one of the manifold air channels.

In some embodiments, an integrated valve and manifold assembly comprises a water valve configured to selectively divert a first portion of a stream of water to a first outlet and a second portion of the stream of water to a second outlet; a first manifold comprising a first water conduit in fluid communication with a first water port, wherein a first end of the first water conduit is configured to couple to the first outlet of the water valve; and a second manifold comprising a second water conduit in fluid communication with a second water port, wherein a first end of the second water conduit is configured to couple to the second outlet of the water valve; wherein a water-valve actuator configured to actuate the water valve is disposed adjacent a second end of the first water conduit distal the first end of the first water conduit.

In some embodiments, an integrated valve and manifold assembly comprises a water valve including a water-valve member configured to control an amount of water exiting the valve at a first water-valve outlet; a water-valve shaft rigidly coupled to the water-valve member; and a first manifold including a first water conduit coupled to the first water-valve outlet; wherein the water-valve shaft is disposed at least partially within the first water conduit.

Features, functions, and advantages may be achieved independently in various embodiments of the present disclosure, or may be combined in yet other embodiments, further details of which can be seen with reference to the following description and drawings.

DETAILED DESCRIPTION

Figure 1:
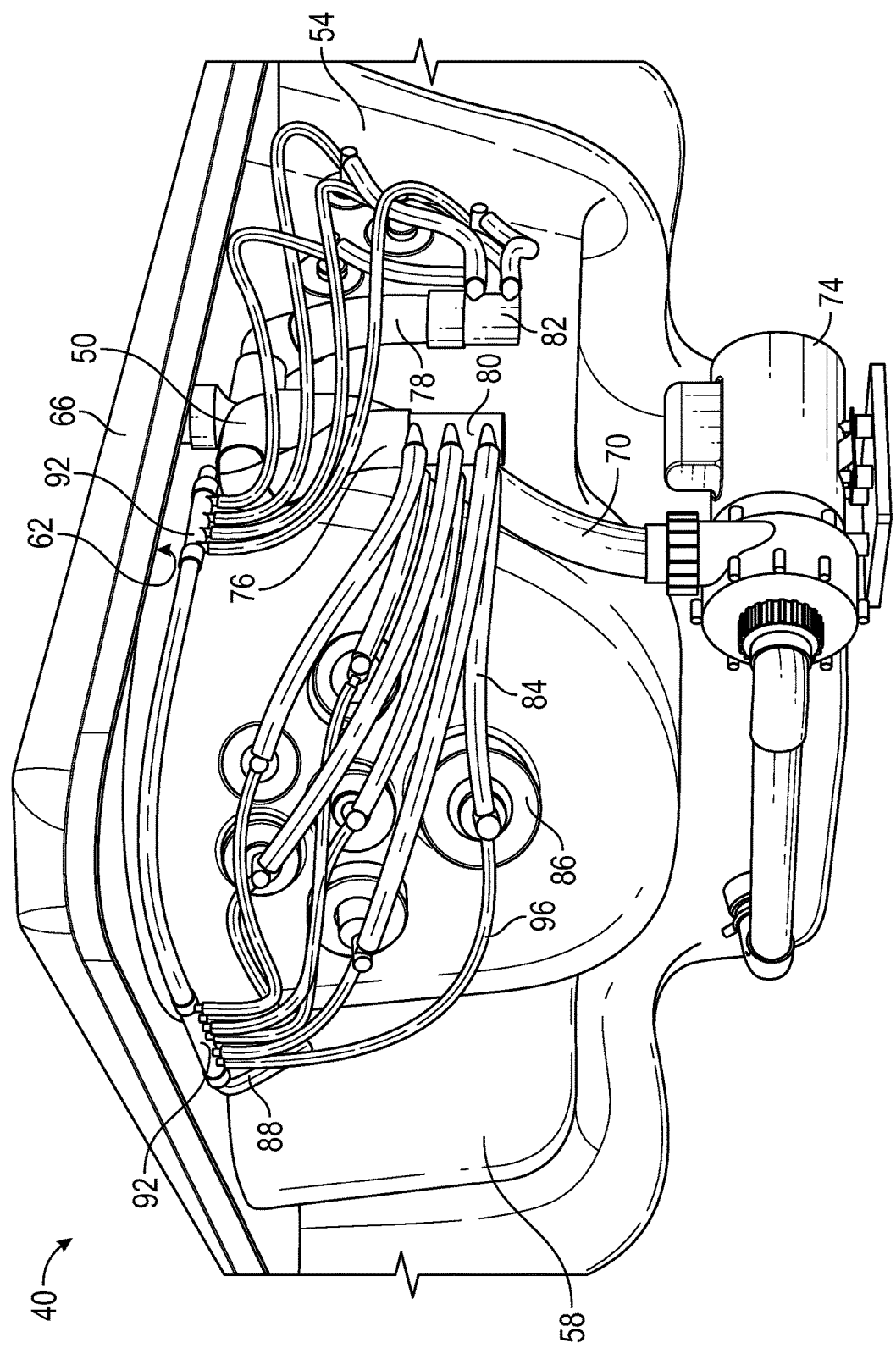
FIG. 1 is an isometric view of an exemplary prior-art hot-tub plumbing system

Various aspects and examples of integrated valve and manifold assemblies are described below and illustrated in the associated drawings. Unless otherwise specified, a valve and manifold assembly in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through E, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Hot tub" and "hot-tub plumbing system" are used throughout this disclosure to mean any equipment that uses jets to provide mixed streams of air and water. This includes not only conventional spas, but also swim spas, therapy pool, and the like.

"In fluid communication" is used to describe parts which are coupled (whether directly or indirectly through intervening components) in such a way that a fluid, liquid, gas, and/or any other suitable substance capable of flowing, running, and/or moving in a fluid manner can move freely between the parts. Parts may be in direct fluid communication, wherein the substance can move directly from one part to the other and/or vice versa. Parts also may be in indirect fluid communication, wherein the substance can move from one part to an intermediate part or parts and from the intermediate parts or parts to the second part and/or vice versa.

Overview

In general, a valve and manifold assembly in accordance with aspects of the present teachings includes at least one manifold and a valve body having an inlet and at least a first outlet, which is configured to be couplable to the manifold. The valve body may be coupled to the manifold either directly or through a short adapter. A valve member disposed within the valve body is configured to selectively control flow of water into the manifold. The valve member is actuatable by a control knob or other interface device coupled to the valve member by a valve shaft.

In some examples, the valve body includes the inlet, the first outlet, and a second outlet. The valve in these examples may be referred to as a two-outlet valve or a two-way valve. The second outlet is, like the first outlet, configured to be couplable to a manifold, either directly or through a short adapter. In some examples, however, one or both outlets may instead be coupled directly or by an adapter to a pipe continuation. In a two-outlet valve, water enters the valve body at the inlet and can exit the valve body at the first outlet, at the second outlet, or at both outlets, depending on the position of the valve member. The valve member is configured to selectively restrict the flow of water out one or both of the outlets.

In some examples, selectively restricting the flow at one or both outlets includes at least partially diverting water from one outlet to the other. For example, the valve member may be transitionable between a first position wherein the valve member prevents water from exiting at the first outlet and allows water to exit at the second outlet, and a second position wherein the valve member allows water to exit at the first outlet and prevents water from exiting at the second outlet. The valve member may be further transitionable to and from a plurality or continuum of intermediate positions wherein the valve member allows a first nonzero amount of water to exit at the first outlet and a second nonzero amount of water to exit at the second outlet.

Typically, the assembly is installed in a plumbing system in such a manner that each outlet provides water to a separate set of jets. For example, the first outlet may be coupled to a first manifold coupled to a first set of jets, and the second outlet may be coupled to a second manifold coupled to a second set of jets. Accordingly, the valve member of the two-outlet valve controls the amount of water flowing to each of the first and second sets of jets.

In some examples, the valve body further includes a third outlet, fourth outlet, or any other suitable number of outlets, and the valve member is configured to control the flow of water exiting the valve body at each outlet, or at subsets of the outlets. Any suitable number of the outlets may be coupled to manifolds and/or pipes. In these examples, the valve may be referred to as a multi-outlet or multiple-outlet valve. A two-outlet valve as described above is an example of a multi-outlet valve.

In some examples, the valve body includes the inlet and the first outlet and does not include any other outlet. The valve in these examples may be referred to as a one-outlet valve or a one-way valve. In these examples, water enters the valve body at the inlet and exits at the first outlet. The valve member is configured to control the flow of water at the first outlet (e.g., by at least partially obstructing the first outlet and/or the inlet). For example, the valve member may be transitionable between a first position wherein it completely obstructs the inlet, and a second position wherein it completely fails to obstruct the inlet. The valve member may be further transitionable to and from a plurality or continuum of intermediate positions wherein it partially obstructs the inlet to a selected extent.

In some examples including a valve having one, two, or more outlets, the valve body is configured such that the valve shaft extends through the manifold coupled to the first outlet. This arrangement may allow the valve actuator (e.g., a knob) to be disposed on a topside portion of a hot-tub shell without requiring that the valve body be disposed near the topside portion. In contrast, conventional systems typically must position the valve body near the topside portion of the shell to allow the valve knob to be accessible to a hot-tub user.

In some examples, the valve and manifold assembly includes one or more dual-extrusion manifolds and a valve body having one or more outlets configured to be couplable to the dual-extrusion manifold(s). A dual-extrusion manifold in accordance with aspects of the present teachings includes at least one air conduit and at least one water conduit that are connected to each other externally (e.g., at respective peripheries) but are not in fluid communication with each other. The water and air conduits each have a respective inlet and one or more respective egress ports (e.g., barbs). Typically, each water egress port is disposed adjacent a respective air egress port, and the pair of egress ports is coupled to a dual-extrusion tube configured to carry the water and air in separate, adjacent channels. The dual-extrusion tube may carry the water and air streams to a same jet and/or to any other suitable location.

A valve configured to be couplable to a dual-extrusion manifold includes a one-outlet or multi-outlet valve body as described above, wherein the outlet(s) are configured to be coupled to respective water conduit(s) of dual-extrusion manifold(s). In some examples, the valve body is attached to one or more air conduits configured to couple to the air conduit(s) of the dual-extrusion manifolds. Alternatively, or additionally, the valve body may include caps configured to seal open ends of the manifold air conduit(s).

The flow of water to the dual-extrusion manifolds is controllable by the valve body, and the flow of air to the dual-extrusion manifolds may be controllable by any suitable device. In some examples, the air flow is controllable by an air valve having a knob or other suitable actuator disposed adjacent the water valve knob. This arrangement may be convenient for a user of the hot tub. In some examples including a dual-extrusion manifold having more than one air channel, the assembly may include a coupling pipe configured to couple the manifold air channels to each other and/or to the air valve, such that the air valve can control air flow to all of the manifold air channels.

A valve and manifold assembly in accordance with the present teachings may include valves and manifolds that are manufactured separately and assembled together to form the assembly. In such an example, the valves and manifolds may be coupled together releasably or nonreleasably. For example, valves and manifolds may be coupled to each other using clips, buckles, detents, threaded connections, friction fits, adhesives, welds, and/or any other suitable releasable and/or nonreleasable connections. Additionally, or alternatively, one or more valves may be manufactured integrally with one or more manifolds or other components.

Use of an assembly comprising a one-outlet or multi-outlet water valve coupled to one or more dual-extrusion manifolds may allow a simpler plumbing system than conventional systems. FIG. 1 depicts an example of a conventional hot-tub plumbing system 40, which is described here to help illustrate some disadvantages of conventional systems compared to aspects of the present teachings. As shown in FIG. 1, conventional hot-tub plumbing system 40 includes a water valve body 50 disposed in an interior portion 54 of a hot-tub shell 58 adjacent an underside 62 of a topside portion 66. Having valve body 50 in this location enables the valve knob (not shown) to be accessible to an occupant of the hot tub. However, having the valve body in this location necessitates a large number of hosing segments and hosing couplers. For example, inlet hose 70 connects a water pump 74 to valve body 50, and first and second manifold hoses 76, 78 connect valve body 50 to respective first and second water manifolds 80, 82. A plurality of water jet hoses 84 deliver water from manifolds 80, 82 to a plurality of jets 86. The many lengths of tubing in this conventional system tend to be difficult to install, prone to failure, and hydraulically inefficient.

FIG. 1 further depicts a plurality of air tubes 88 configured to deliver air from an air source (not shown) to a plurality of air manifolds 92, and a plurality of air jet hoses 96 deliver air from the air manifolds to jets 86. A valve and manifold assembly including one or more dual-extrusion manifolds, in accordance with aspects of the present teachings, requires far less hose and fewer couplers.

Examples, Components, and Alternatives

The following sections describe selected aspects of exemplary integrated valve and manifold assemblies, as well as related systems and/or methods. As described above, an integrated valve and manifold assembly in accordance with the present teachings may in general include any suitable water valve(s) (e.g., one-outlet valves and/or multi-outlet valves) coupled to any suitable combination of dual-extrusion manifolds, single-extrusion manifolds, pipe couplers, pipe continuations, and/or other suitable plumbing component(s). In some examples, the assembly includes an air valve, and in other examples, the assembly does not include an air valve. Accordingly, the examples in the following sections are intended for illustration and should not be interpreted as limiting the scope of the present disclosure. Each section may include one or more distinct embodiments or examples, and/or contextual or related information, function, and/or structure.

A. Illustrative Two-Outlet Dual-Extrusion Assembly

With reference to FIGS. 2-10, this section describes an illustrative two-outlet dual-extrusion assembly 100. Assembly 100 is an example of an integrated valve and manifold assembly described above.

Figure 2:
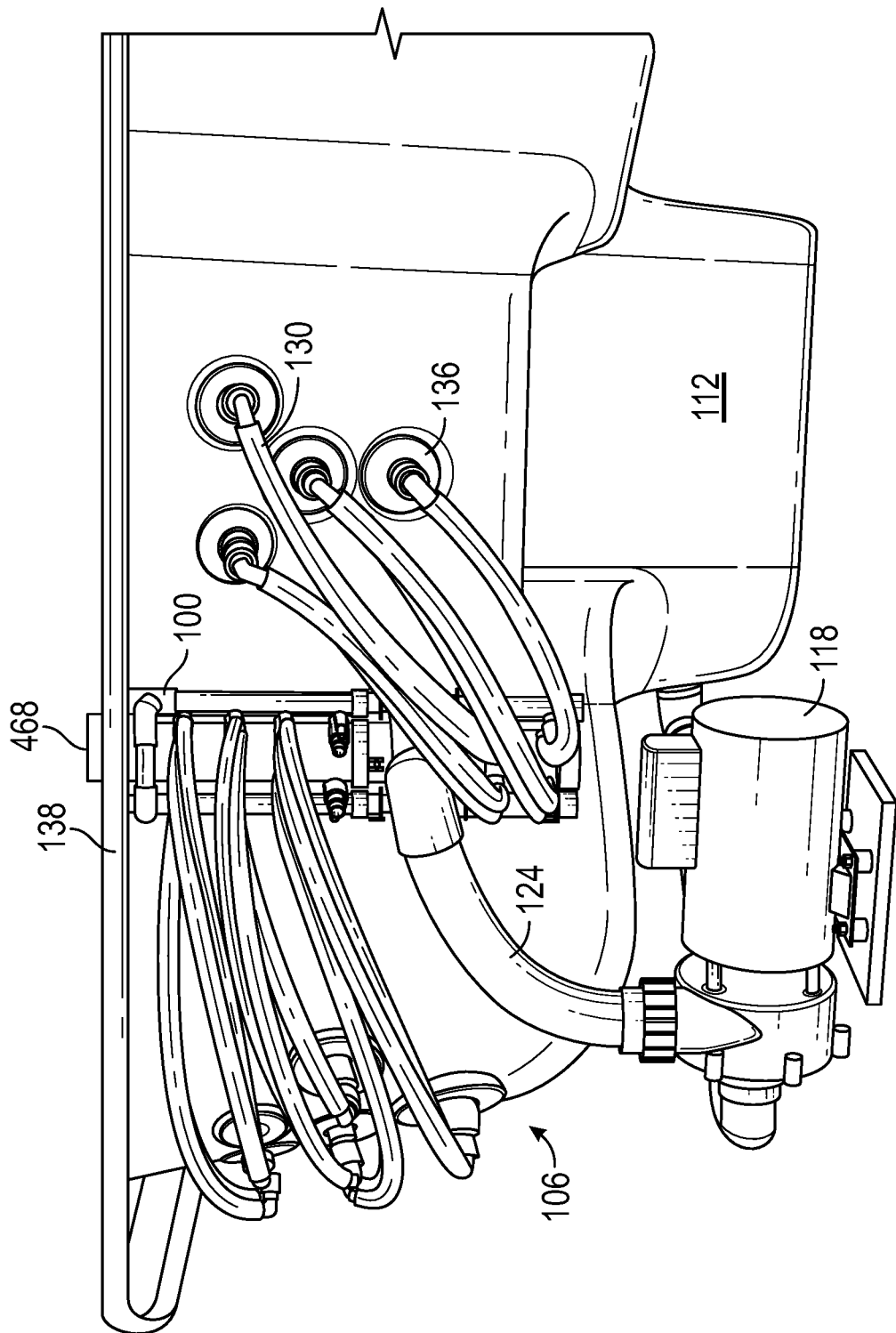
FIG. 2 is an isometric view of an illustrative hot-tub plumbing system using an integrated valve and manifold assembly comprising a two-outlet valve and a pair of dual-extrusion manifolds, in accordance with aspects of the present teachings.

FIG. 2 is an isometric view depicting assembly 100 installed within an interior portion 106 of a hot-tub shell 112. A water pump 118 delivers water to assembly 100 via an inlet hose 124. Air is supplied to assembly 100 directly or indirectly by static atmospheric air, an air blower, and/or any other suitable air supply (not shown). A plurality of dual-extrusion tubes 130 deliver water and air from assembly 100 to a plurality of jets 136. In the depicted example, assembly 100 is oriented vertically and disposed adjacent a topside 138 of hot-tub shell 112. In other examples, the assembly may be oriented in any suitable position and location.

Figure 3:
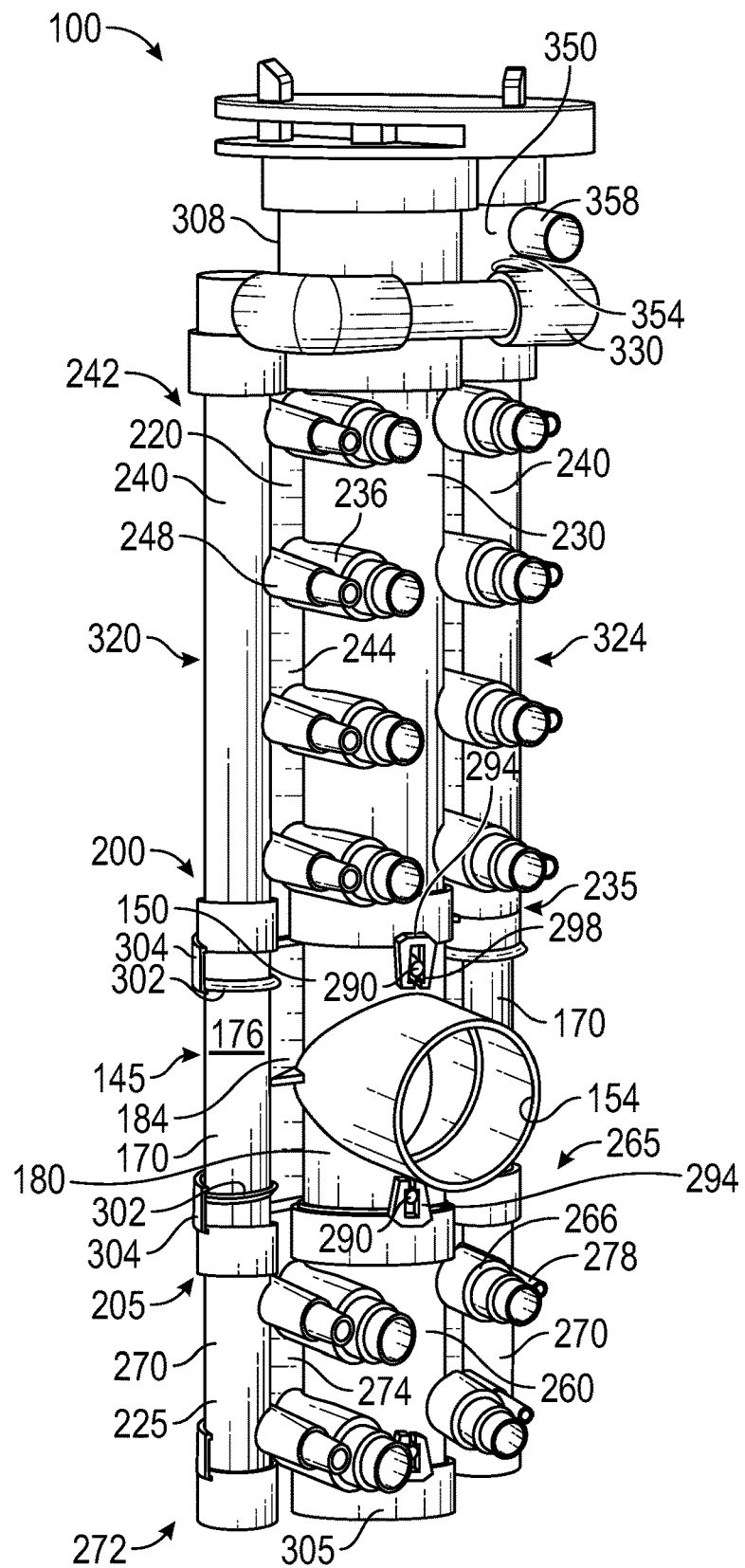
FIG. 3 is an isometric view of the valve and manifold assembly of FIG. 2.
Figure 4:
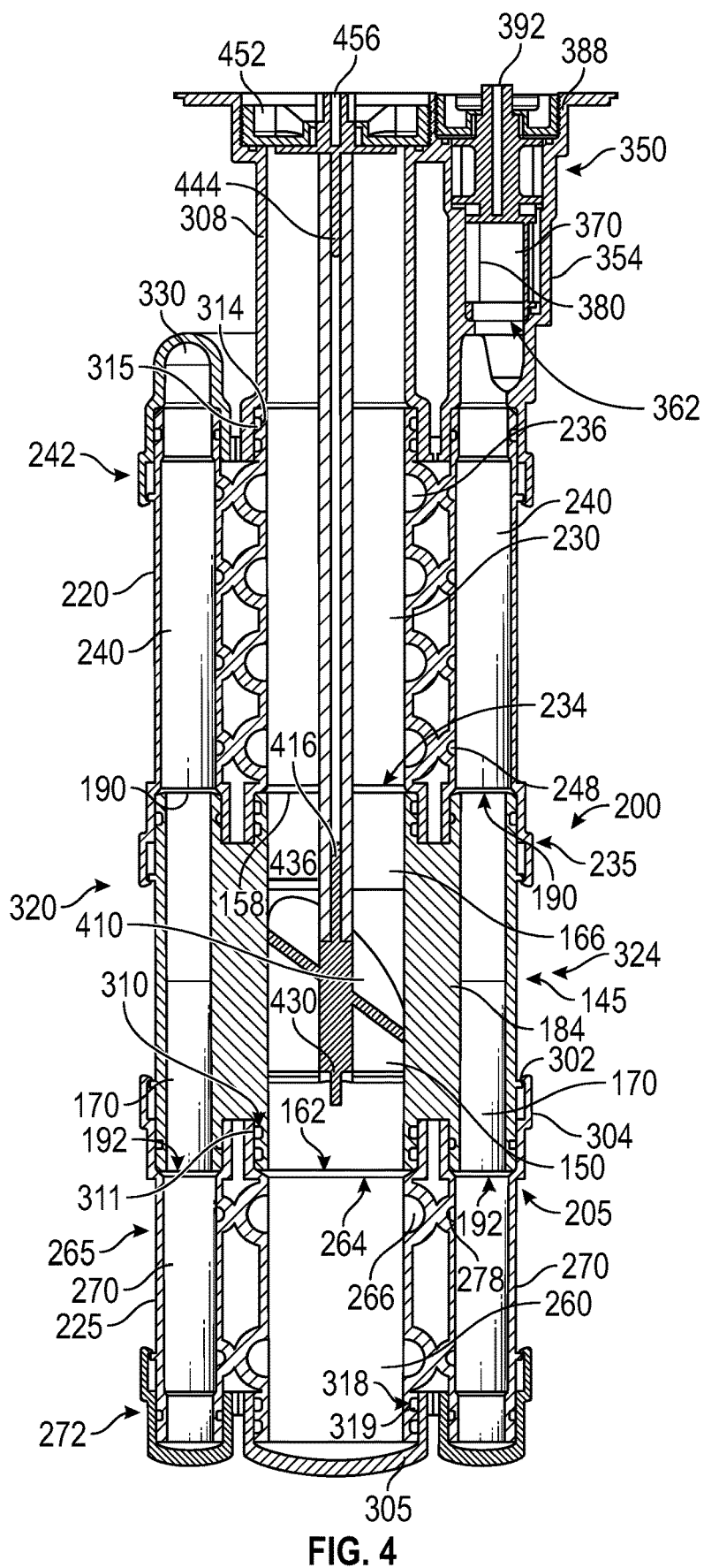
FIG. 4 is a sectional front view of the valve and manifold assembly of FIG. 2.

FIG. 3 is an isometric view depicting assembly 100, and FIG. 4 is a sectional view of the assembly. Assembly 100 includes a two-outlet valve 145 including a valve body 150 having an inlet 154 in fluid communication with a first outlet 158 and a second outlet 162. In normal operation, water enters valve body 150 at inlet 154 and exits the valve body through first outlet 158, through second outlet 162, or partly through the first outlet and partly through the second outlet. Accordingly, an interior 166 of valve body 150 may be referred to as a water conduit, and valve 145 may be referred to as a water valve. However, valve 145 may be used to control the flow of any suitable fluid. Flow of water to outlets 158, 162 is controllable by components of valve 145, discussed in detail below.

Valve 145 further includes a pair of air channels 170. Air channels 170 are each attached externally to valve body 150, such that the air channels and the valve body are integral but the air channels are not in fluid communication with valve-body interior 166. Accordingly, valve 145 is configured to transport air and water separately. In the example depicted in FIG. 3, air channels 170 each have a respective outer surface 176 connected to an outer surface 180 of valve body 150 by a respective peripheral member 184. However, in other examples, the air channels and the valve body may be rigidly or nonrigidly connected in any suitable way. In some examples, the valve includes more than two air channels, or only one air channel. Additionally, or alternatively, in some examples the valve includes more than one conduit for water.

Each air channel 170 has a first end port 190 in fluid communication with a second end port 192. Depending on how assembly 100 is installed in a plumbing system, air may enter air channel 170 at either first end port 190 or second end port 192, and exit at the other end port. In the depicted example, air enters at first end ports 190.

Valve 145 has a first end 200, corresponding to first outlet 158 and first end ports 190 of air channels 170, and a second end 205 corresponding to second outlet 162 and second air-channel end ports 192. First and second ends 200, 205 of valve 145 are each configured to be coupled to a dual-extrusion manifold. In the example depicted in FIG. 3, first end 200 is coupled to an eight-port dual-extrusion manifold 220 (e.g., a dual-extrusion manifold having eight water egress ports and eight air egress ports), and second end 205 is coupled to a four-port dual-extrusion manifold 225 (e.g., a dual-extrusion manifold having four water egress ports and four air egress ports). In general, however, dual-extrusion manifolds coupled to valve 145 in assembly 100 may include any suitable number of egress ports.

Figure 5:
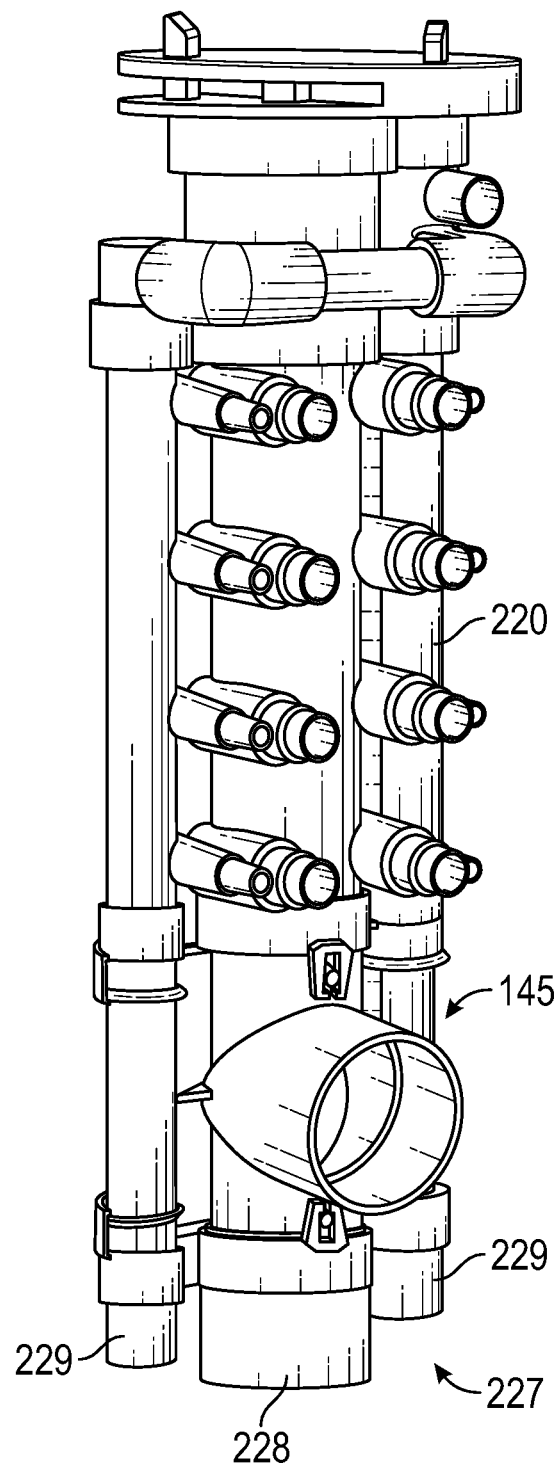
FIG. 5 is an isometric view of another illustrative valve and manifold assembly, comprising the valve of FIG. 2, one of the manifolds of FIG. 2, and a pipe coupler, in accordance with aspects of the present teachings.

In some examples, valve 145 may be coupled at end 200, end 205, or both ends to a pipe coupler 227 (see FIG. 5) rather than a dual-extrusion manifold. FIG. 5 depicts an example wherein dual-extrusion manifold 225 is omitted and second end 205 of valve 145 is coupled to pipe coupler 227, which has a water conduit 228 and a pair of air channels 229, but is not directly coupled to any air or water egress ports. Pipe coupler 227 may, for example, allow one or more dual-extruded manifolds to be located remote from valve 145. This may be convenient, e.g., for installation and/or use in certain hot-tub plumbing systems.

Returning to FIGS. 3-4, dual-extrusion manifold 220 includes a manifold water conduit 230 configured to receive water at a first end 234 of the water conduit. First end 234 of water conduit 230 is disposed at a first end 235 of dual-extrusion manifold 220.

Water conduit 230 is in fluid communication with eight water ports 236. In normal operation, water enters water conduit 230 at first end 234 and exits the water conduit at water ports 236 and is delivered to a plurality of hot-tub jets.

Dual-extrusion manifold 220 further includes a pair of manifold air channels 240 extending substantially from first end 235 of the manifold to a second end 242 of the manifold. Air channels 240 are each attached externally to manifold water conduit 230, such that the air channels and water conduit are not in fluid communication. In the example depicted in FIG. 3, air channels 240 are attached to manifold water conduit 230 at a periphery 244, but in other examples the air channels and water conduit may be connected in any other suitable way. Air channels 240 are each in fluid communication with four air ports 248. In normal operation, air exits air channels 240 at air ports 248 and is delivered to a plurality of hot-tub jets. Each air port 248 is disposed adjacent one of water ports 236, such that each pair of adjacent air and water ports may be coupled to a dual-extrusion tube (e.g., to deliver streams of air and water to a jet). An air port and an adjacent water port may together be referred to as a dual-extrusion port.

Similarly, dual-extrusion manifold 225 includes a manifold water conduit 260 configured to receive water at a first end 264 of the water conduit, which is disposed at a first end 265 of the manifold. Water conduit 260 is in fluid communication with four water ports 266. Manifold 225 further includes a pair of air channels 270 extending substantially from first end 264 to a second end 272, and attached to water conduit 260 at a periphery 274. Two air ports 278 are in fluid communication with each air channel 270, and are disposed adjacent to one of water ports 266.

In the depicted example, the water conduits and air channels of manifolds 220, 225 are substantially straight (e.g., unbent, with substantially no curvature) and extend substantially parallel to each other. In other examples, the water conduits and/or air channels of one or both manifolds may include one or more bends or curved portions, and/or may not extend parallel to each other.

First end 235 of dual-extrusion manifold 220 is configured to couple in fluid communication to first end 200 of valve 145 (e.g. with first water outlet 158 in fluid communication with manifold water conduit 230, and first end ports 190 of air channels 170 in fluid communication with manifold air channels 240). Similarly, first end 265 of dual-extrusion manifold 225 is configured to couple to second end 205 of the valve 145 (e.g., with second water outlet 162 in fluid communication with manifold water conduit 260, and second end ports 192 of air channels 170 in fluid communication with manifold air channels 270).

In the example depicted in FIGS. 3-4, first and second valve ends 200, 205 each include at least one respective protrusion 290 projecting from outer surface 180 of valve body 150, and dual-extrusion manifolds 220, 225 each include a hook 294 configured to engage the respective protrusion. In the depicted example, hook 294 includes a pair of opposing spring-biased resilient arms 298 configured to snap around protrusion 290 and to retain the protrusion between them. However, in other examples, hook 294 may have any other suitable shape. In some examples, hooks 294 are disposed on the valve, and protrusions 290 are disposed on the manifolds.

Each air channel 170 of valve 145 has a lip 302 projecting substantially transversely from exterior surface 176 of the air channel adjacent first valve end 200, and another lip 302 adjacent second valve end 205. Each of the four manifold air channels 240, 270 has a respective hook 304 configured to engage one of the lips 302 when the associated manifold is coupled to valve 145. In the depicted example, hooks 304 comprise resilient spring-biased hooks, but in other examples the hooks may have any other form suitable to engage lip 302. In some examples, hooks 304 are disposed on the valve and lips 302 are disposed on the manifolds.

Protrusions 290 and hooks 294, as well as lips 302 and hooks 304, are configured to couple the valve and manifolds together such that the end of the manifold water conduit is coupled in fluid communication with the associated end of the valve water conduit, and the end of the manifold air channels are coupled in fluid communication with the associated ends of the valve air channels.

In the example depicted in FIGS. 3-4, second end 272 of dual-extrusion manifold 225 (e.g., the end of the manifold not directly coupled to valve 145) terminates in a cap 305. Cap 305 may be coupled to dual-extrusion manifold 225 using complementary hooks and protrusions (e.g. hooks 294 and protrusions 290) and/or complementary hooks and lips (e.g., hooks 304 and lips 302), and/or any other suitable devices. In some examples, cap 305 is integral with manifold 225 (e.g., having been manufactured as a part of the manifold, having been welded and/or glued to the manifold, etc.). In examples wherein cap 305 is attached to manifold 225 after manufacture, it may seal otherwise open ends of the manifold water conduit 260 and/or manifold air channels 270. In other examples, cap 305 may be omitted. For example, manifold 225 may be coupled at second end 272 to another device(s), or may be sealed by another mechanism.

Second end 242 of dual-extrusion manifold 220 (e.g., the end of the manifold not directly coupled to valve 145) terminates in an assembly top 308. Assembly top 308 may be connected to second end 242 of dual-extrusion manifold 220 using complementary hooks and lips and/or by any other suitable mechanism. Assembly top 308 is described below.

Although the depicted example includes components (e.g., a water valve, manifolds, cap, and assembly top) that are fitted together using the hooks, lips, and protrusions described above, in other examples some or all of the components are manufactured as monolithic piece, or are joined together irreversibly (e.g., by welding, adhesive(s), and/or the like).

As shown in FIG. 4, valve body 150 includes a plurality of grooves 310, and a respective O-ring 311 is disposed in each groove to facilitate a substantially watertight connection between the valve body and manifolds 220, 225. Manifold 220 includes a plurality of grooves 314 and a respective O-ring 315 disposed in each groove to facilitate a substantially watertight connection between the manifold and assembly top 308. Manifold 225 includes a plurality of grooves 318 and a respective O-ring 319 disposed in each groove to facilitate a substantially watertight connection between the manifold and cap 305.

As described above, water valve 145 is in fluid communication with manifold water conduits 230 and 260, and the manifold water conduits are in fluid communication with each other via water valve 145. Air channels 170 attached to valve body 150 are each in fluid communication with a respective one of manifold air channels 240 and a respective one of manifold air channels 270. Accordingly, one set of air channels 170, 240, and 270 form a first assembly air channel 320, and the other set of air channels 170, 240, and 270 form a second assembly air channel 324 on a second side of assembly 100.

Assembly air channels 320, 324 are coupled together by an air coupler 330. Air coupler 330 comprises a tube or other suitable device(s) providing fluid communication between assembly air channel 320 and assembly air channel 324. In the depicted example, air coupler 330 is part of assembly top 308, but in other examples, one or more air couplers may be disposed on any suitable part of the assembly (e.g., directly connected to any combination of air channels 170, 240, and 270 suitable to enable fluid communication between assembly air channel 320 and assembly air channel 324).

Air coupler 330 further couples assembly air channels 320, 324 to an air valve 350, such that the assembly air channels are in fluid communication with a body 354 of the air valve. Air valve 350 includes air valve body 354, which has an air inlet 358 and an air outlet 362 coupled to air coupler 330. In normal operation, air enters air valve body 354 at air inlet 358 and exits at air outlet 362. Air entering valve 350 at air inlet 358 may be provided by, e.g., a hose coupled to an air supply system.

Figure 6:
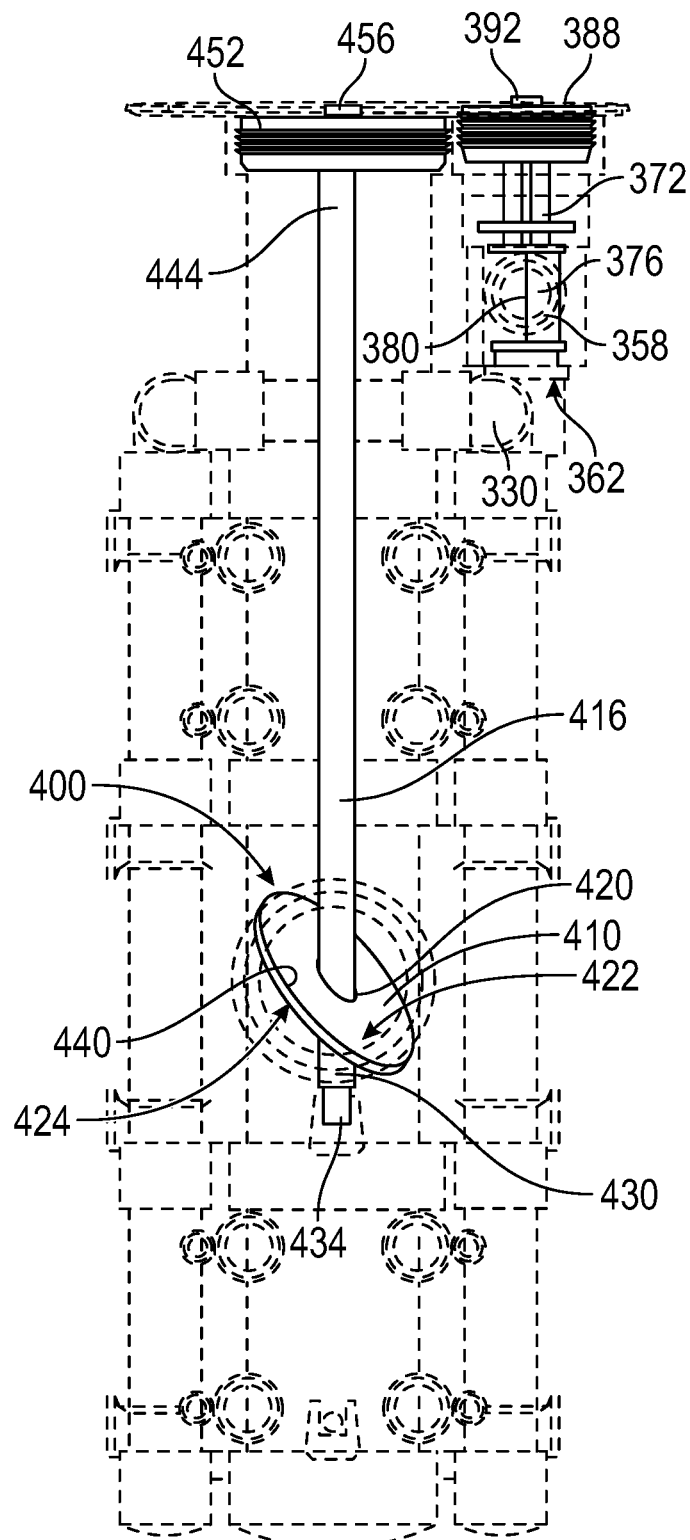
FIG. 6 is a front view of the valve and manifold assembly of FIG. 2, with portions of the assembly depicted in dashed lines and an illustrative water valve member and an illustrative air valve member depicted in solid lines.
Figure 7:
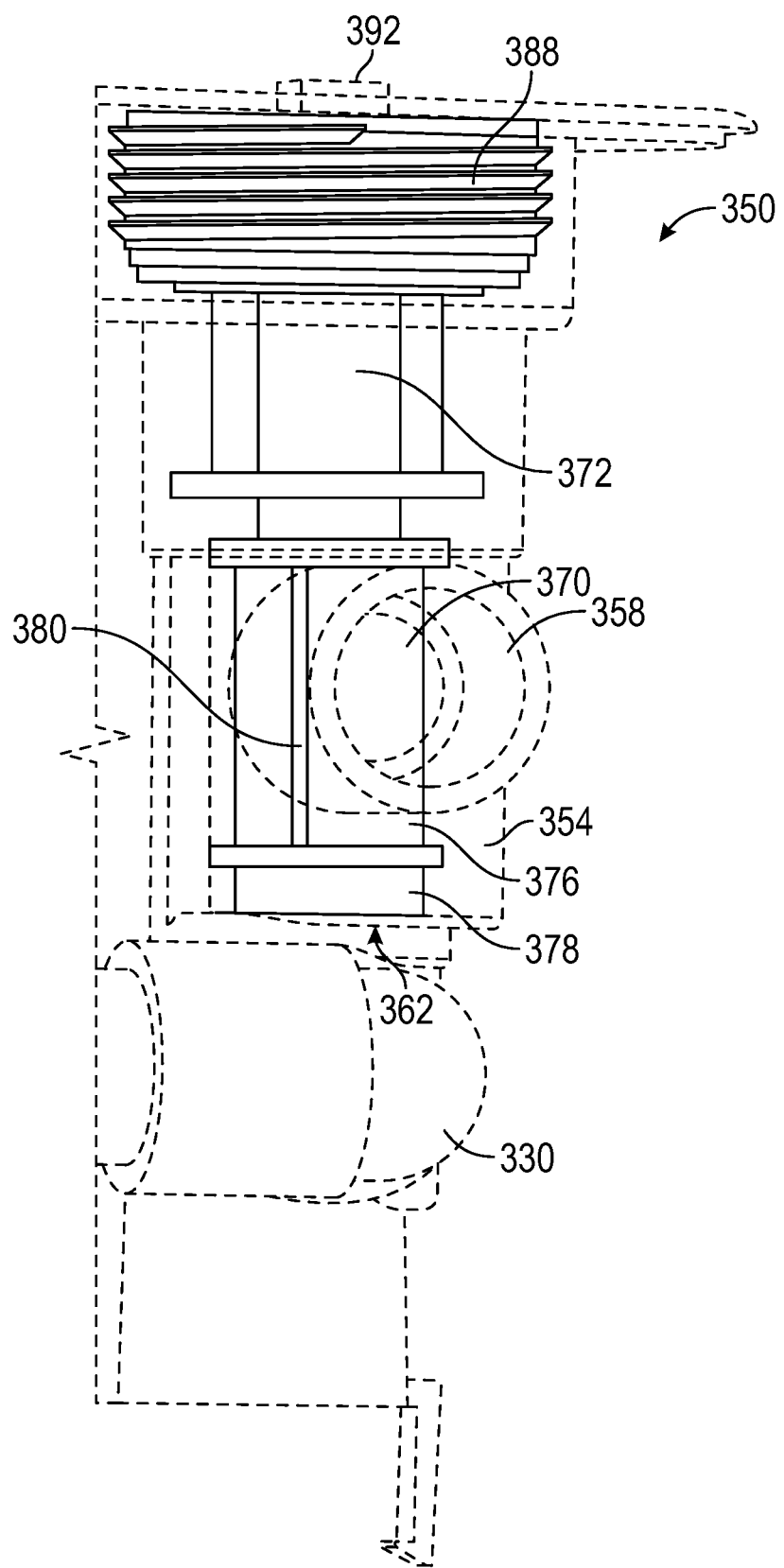
FIG. 7 is a partial isometric view of the valve and manifold assembly of FIG. 2, with portions of the assembly depicted in dashed lines and the air valve member of FIG. 6 depicted in solid lines.

Via air coupler 330, air valve body 354 is in fluid communication with air assembly channels 320, 324. Air flow from air inlet 358 to air coupler 330 is controllable by an air valve member 370 of air valve 350. FIGS. 6-7 depict air valve member 370 within air valve 350. FIG. 6 is a front view and FIG. 7 is a partial isometric view. In FIGS. 6-7, air valve body 354 and certain other assembly components are depicted in dashed lines, and air valve member 370 and certain other components are depicted in solid lines for clarity.

In some examples, air coupler 330 is omitted, and separate air valves are coupled to each assembly air channel.

As shown in FIGS. 6-7, air valve member 370 comprises an upper portion 372, a wall 376 rigidly connected to the upper portion, and a bottom end 378 connected to the wall. Bottom end 378 is substantially open, such that air valve body 354 is in fluid communication with air coupler 330. Wall 376 extends around only a portion of the circumference of air valve member 370. An opening 380 is defined between upper portion 372, wall 376, and bottom end 378. Opening 380 is in fluid communication with open bottom end 378.

Air valve member 370 is rotatable within air valve body 354. Air valve member 370 may be rotatable within any suitable range of angular positions (e.g., within a range of 360 degrees, 180 degrees, 90 degrees, and/or any other suitable span of angular positions).

Air inlet 358 faces air valve member 370. Air inlet 358 and wall 376 are, in some examples, shaped and positioned such that there exists at least one angular position of air valve member 370 wherein wall 376 completely blocks the air inlet. With air valve member 370 in this position, which may be referred to herein as the off position, air inlet 358 and air valve body 354 are not in fluid communication. In other words, wall 376 seals the inlet.

Air valve member 370 is rotatable from the off position to at least one position (referred to as an on position) wherein at least a portion of opening 380 of the valve member communicates with air inlet 358, such that the air inlet and air valve body 354 are in fluid communication, and the air inlet is in fluid communication with air coupler 330.

In some examples, air valve member 370 is rotatable between the off position and only one on position. In other examples, including the example depicted in FIGS. 6-7, air valve member 370 is rotatable between the off position and a plurality of on positions. Each of the on positions is associated with a different angular position of air valve member 370. Based on the angular position of air valve member 370, air inlet 358 may be completely blocked by wall 376, partially blocked by the wall, or completely unblocked by the wall. The rate at which air can flow into air valve body 354 at air inlet 358 depends on the fraction of the air inlet that is exposed to opening 380 rather than obstructed by wall 376. Accordingly, the flow of air into air valve body 354 at air inlet 358 is based on the angular position of air valve member 370, and the on positions of the valve member each correspond to a respective amount of air flow.

In some examples, air valve member 370 has no off position. In other words, there is no position at which wall 376 completely blocks air inlet 358. In these examples, the flow of air into assembly 100 may be stoppable by another mechanism (e.g., a device in another part of the plumbing system).

In general, air valve member 370 may be rotated between the off position and the one or more on positions by any suitable method, including manual actuation by a user (either directly or through one or more interaction devices, examples of which are described below), automatic or partially automatic actuation by an electronic controller, and so on.

In the depicted example, wall 376 takes the shape of a longitudinal cylindrical section. In other examples, however, wall 376 may have any shape suitable for selectively obstructing air inlet 358.

Upper portion 372 of air valve member 370 extends through a threaded air plug 388 configured to be threadedly received in assembly top 308. Plug 388 helps to prevent air valve member 370 from tilting, and helps to seal air valve 350 against air egress. Air valve member 370 is rotatable within plug 388. A top portion 392 of air valve member 370 protrudes from plug 388 (e.g., outside the air valve). Top portion 392 may be coupled to an interface device to allow a user to rotate air valve member 370 (e.g., to operate the air valve), as described below. Top portion 392 is rigidly connected to upper portion 372 of air valve member 370, and may be referred to as a valve shaft of the air valve.

Figure 8:
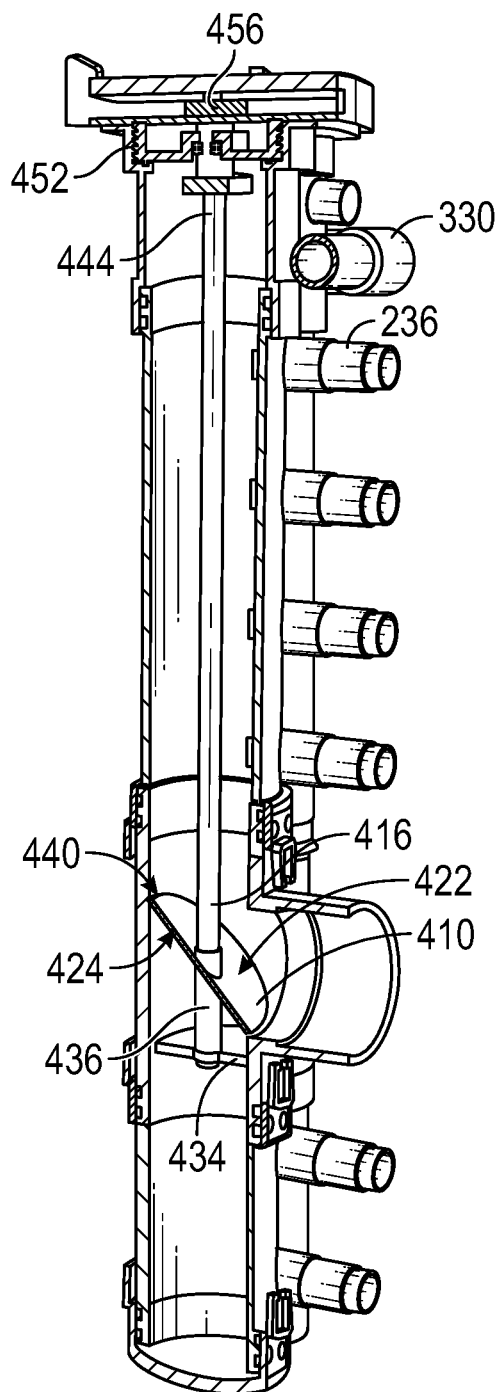
FIG. 8 is a sectional isometric view of the valve and manifold assembly of FIG. 2.

FIG. 6 further depicts a water valve member 400 within water valve body 150 of water valve 145. FIG. 8 is a sectional view of assembly 100 depicting water valve member 400. As described above, water valve 145 is a two-outlet valve configured to selectively control the flow of water entering water valve body 150 at water inlet 154 to first outlet 158 and second outlet 162. Water valve member 400 comprises a disc 410 rigidly connected to a valve shaft 416. Valve shaft 416 extends through a central portion 420 of disc 410. Disc 410 is attached to valve shaft 416 at an angle (e.g., such that first surface 422 and second surface 424 of the disc each form a nonperpendicular angle with the shaft).

Valve shaft 416 is rotatably attached at a first end 430 to a support bar 434 disposed within valve body 150 near second outlet 162 and rigidly connected to an inner wall 436 of the valve body. Valve shaft 416 extends through first outlet 158 and through water conduit 230 of dual-extrusion manifold 220 to assembly top 308. Valve shaft 416 is rotatable, and disc 410 is configured to rotate with the valve shaft. Valve shaft 416 may be substantially parallel to air-valve upper portion 372 (e.g., to the valve shaft of the air valve).

Disc 410 is sized and shaped to selectively either divert a stream of water entering valve body 150 at water inlet 154 to first outlet 158, divert the stream to second outlet 162, or divert a first portion of the stream to the first outlet and a second portion of the stream to the second outlet. In the depicted example, an interior of valve body 150 defines a cylinder extending between first outlet 158 and second outlet 162, and disc 410 comprises a cylindric section of the cylinder. Put another way, a projection of disc 410 onto a plane transverse to shaft 416 is substantially equal in size and shape to a cross-section of valve body 150. Accordingly, an edge 440 of disc 410 engages inner wall 436 at all portions of the edge, except when valve shaft 416 is rotated such that a portion of the edge of the disc is adjacent inlet 154.

Water valve member 400 is rotatable between at least a first angular position wherein disc 410 substantially blocks fluid communication between inlet 154 and first outlet 158, and a second angular position wherein the disc substantially blocks fluid communication between the inlet and second outlet 162. In the first angular position, disc 410 diverts most or substantially all water entering at inlet 154 to second outlet 162. In the second angular position, disc 410 diverts most or substantially all water entering at inlet 154 to first outlet 158. FIG. 8 depicts disc 410 in the second angular position.

In some examples, water valve member 400 is rotatable only between the first and second positions. In other examples, including the depicted example, water valve member 400 is rotatable between the first and second positions and a plurality of intermediate positions wherein disc 410 partially blocks first outlet 158 and partially blocks second outlet 162. FIG. 6 depicts disc 410 in one of the intermediate positions.

A second end 444 of valve shaft 416 is retained within a threaded water plug 452. Threaded water plug 452, which is threadedly received within assembly top 308, prevents valve shaft 416 from tilting and helps to seal the assembly top against water egress. Valve shaft 416 is rotatable within plug 452. A top portion 456 of water valve member 400 protrudes from plug 452.

Figure 9:
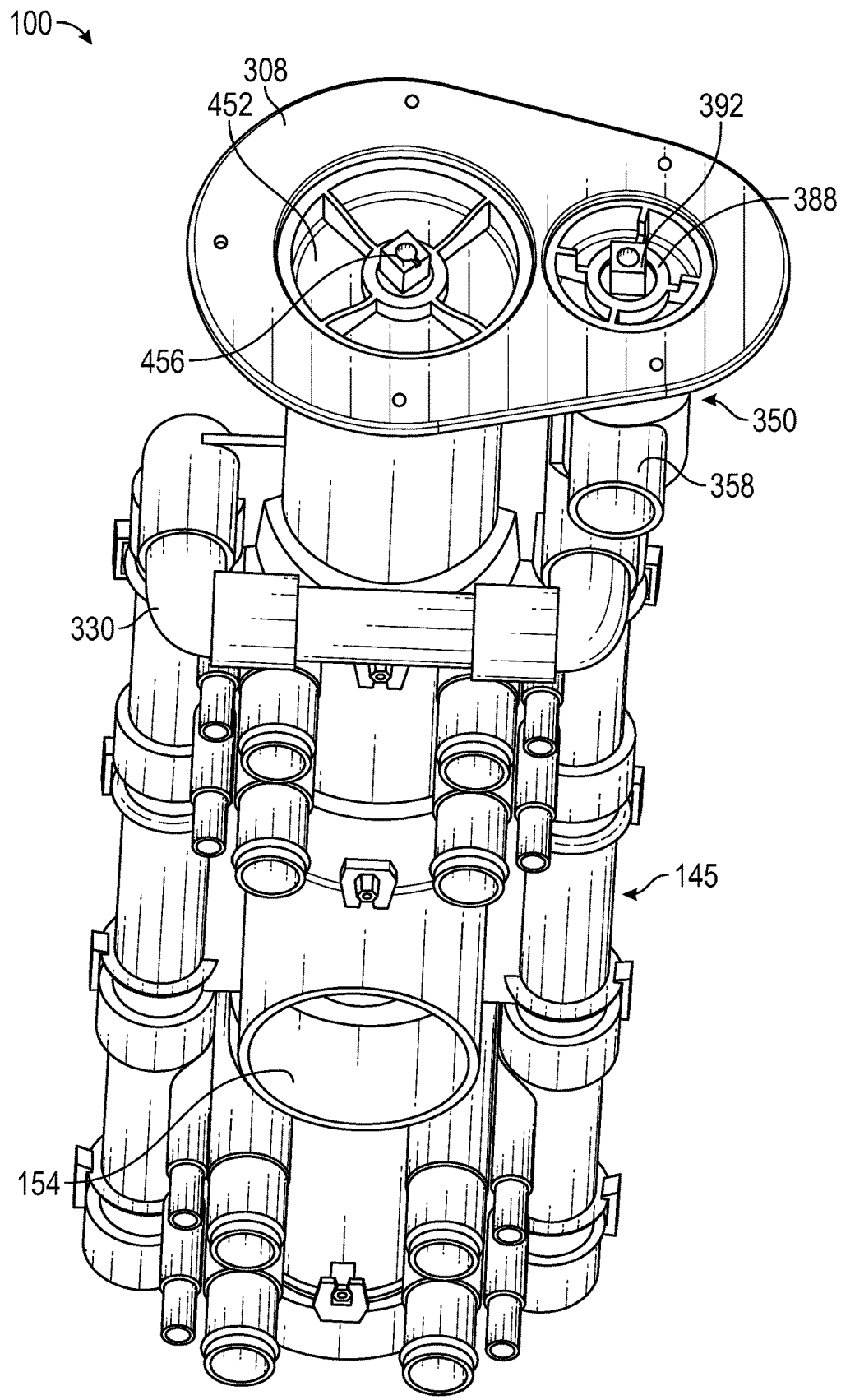
FIG. 9 is an isometric view depicting an illustrative assembly top of the valve and manifold assembly of FIG. 2.
Figure 10:
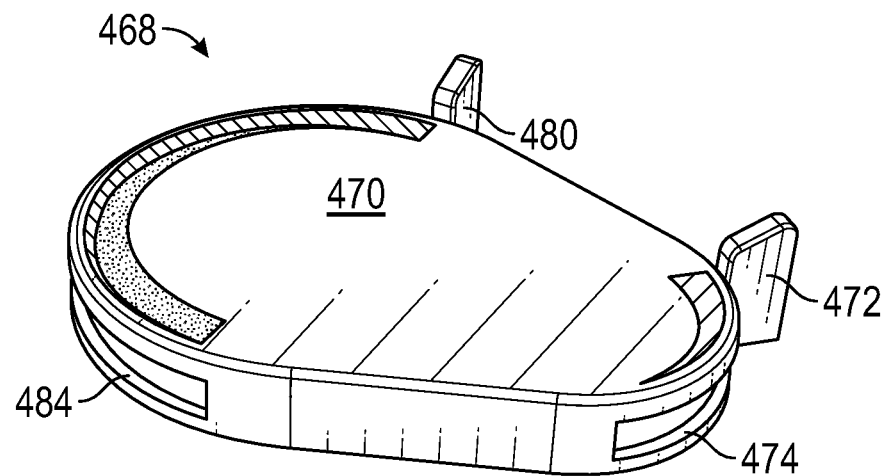
FIG. 10 is an isometric view depicting an illustrative tab attachment device configured to attach to the assembly top of FIG. 9, in accordance with aspects of the present teachings.
Figure 11:
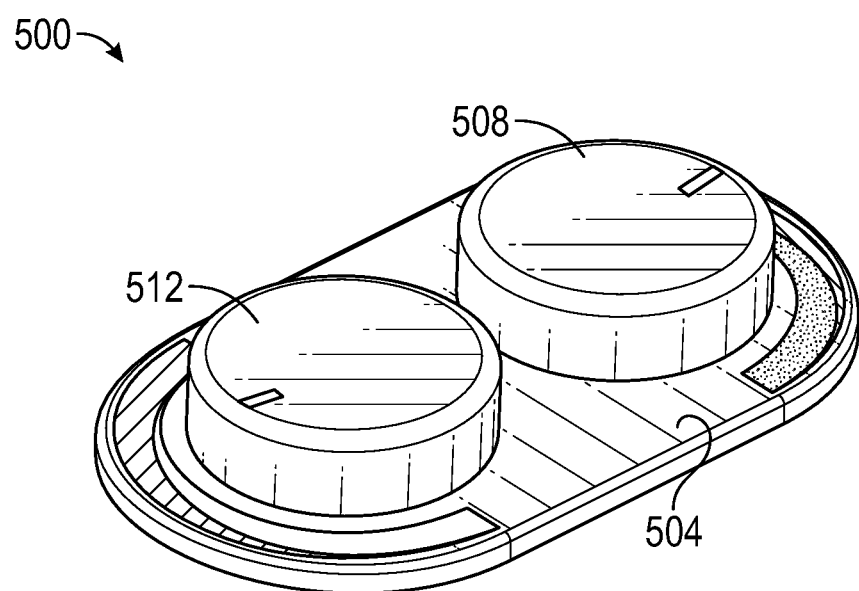
FIG. 11 is an isometric view depicting an illustrative knob attachment device configured to attach to the assembly top of FIG. 9, in accordance with aspects of the present teachings.

FIG. 9 is an isometric view of assembly 100 depicting assembly top 308. FIG. 9 depicts top portion 392 of air valve member 370 and top portion 456 of water valve shaft 416. A user may rotate top portions 392, 456 to actuate air valve 350 and water valve 145, respectively. In order to facilitate actuation of the valves (e.g., by a user's hand), assembly top 308 optionally may include one or more interface devices coupled to top portions 392, 456. Exemplary interface devices may include, without limitation, one or more knobs, tabs, dials, buttons, toggles, switches, and/or the like. FIGS. 10-11 depict illustrative interface devices.

FIG. 10 is an isometric view of an illustrative tab attachment device 468. Tab attachment device 468 includes a housing 470 configured to be coupled to assembly top 308.

Tab attachment device 468 includes a first tab 472 extending from a slot 474 in housing 470. First tab 472 is configured to be rigidly coupled to air-valve top portion 392. A user may move tab 472 along slot 474 to control the flow of air entering assembly 100 at air inlet 358.

Tab attachment device 468 further includes a second tab 480 extending from a slot 484 in housing 470 and configured to be rigidly coupled to water-valve top portion 456. A user may move tab 480 along slot 484 to control the flow of water into dual-extrusion manifolds 220, 225 (e.g., to control a fraction of water that is diverted to one manifold rather than the other).

FIG. 11 is an isometric view of an illustrative knob attachment device 500. Knob attachment device 500 includes a housing 504 configured to be coupled to assembly top 308. A first knob 508 is configured to be coupled to air-valve top portion 392, and a second knob 512 is configured to be coupled to water-valve top portion 456. Accordingly, rotating each knob actuates the respective valve.

Knobs 508, 512 and tabs 472, 480 are configured to rotate the respective associated valve members among a continuum of different settings. In other examples, an attachment device may be configured to rotate a valve member between a predetermined number of discrete settings (e.g., between an on setting and an off setting, or between a setting that diverts all water to a first manifold and a setting that diverts all water to a second manifold).

In some examples, assembly 100 is installed in a plumbing system vertically, with assembly top 308 oriented upward (e.g., near a topside of the hot-tub shell) and cap 305 oriented toward the ground, as shown in FIG. 2. This orientation typically allows the air-valve shaft and water-valve shaft to be accessible at the topside of the shell, so that an occupant of the hot tub can easily operate the valves. However, in other examples, assembly 100 may be installed in any suitable orientation (e.g., horizontally, at an angle, with assembly top 308 oriented toward the ground, etc.).

B. Illustrative Two-Outlet Single-Extrusion Assembly

Figure 12:
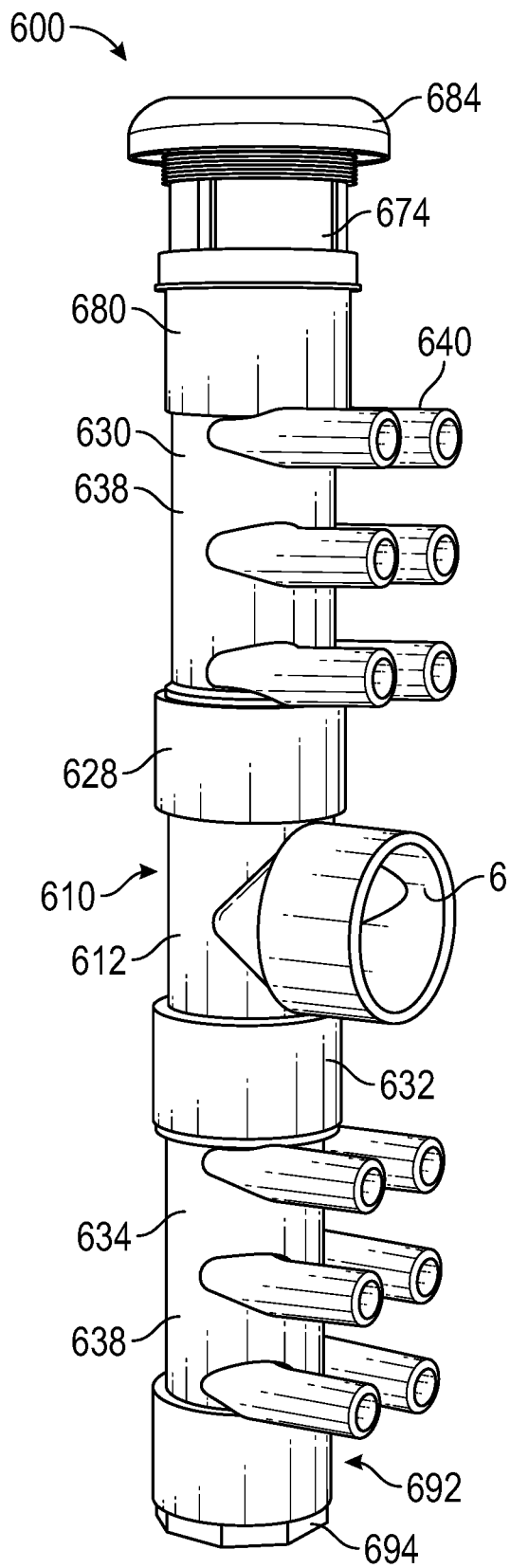
FIG. 12 is an isometric view of another illustrative integrated valve and manifold assembly, comprising a two-outlet valve and a pair of single-extrusion manifolds, in accordance with aspects of the present teachings.
Figure 13:
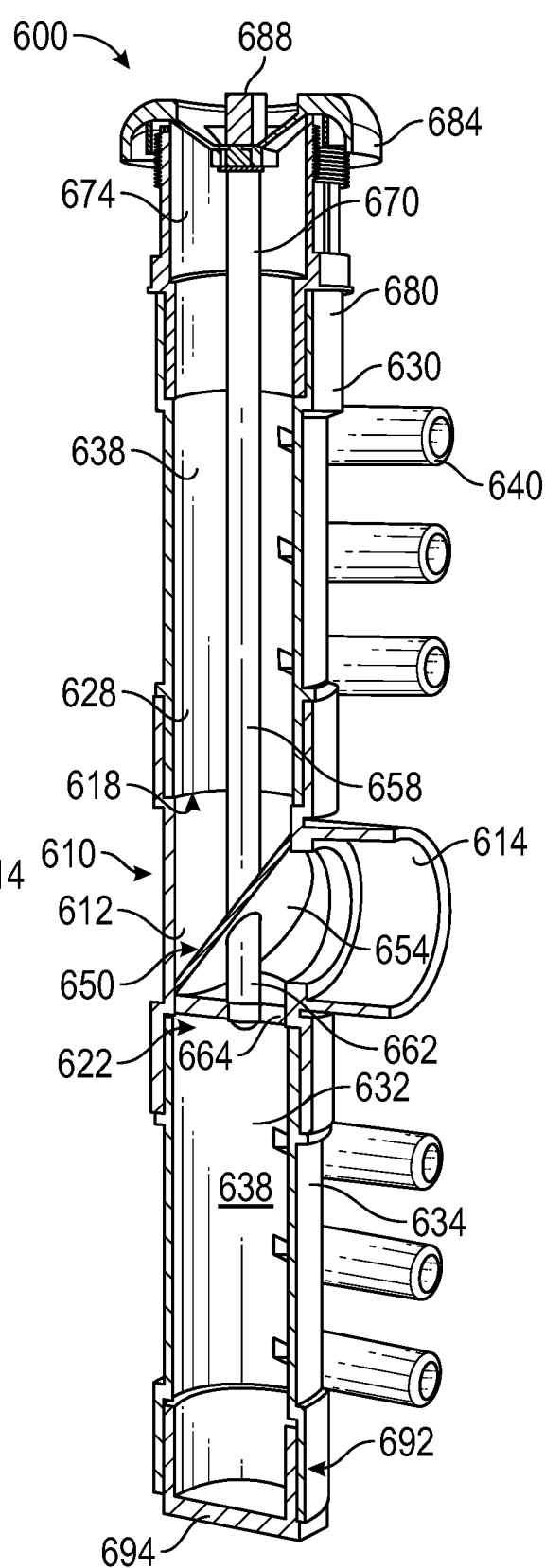
FIG. 13 is a sectional isometric view of the valve and manifold assembly of FIG. 12.

With reference to FIGS. 12-13, this section describes an illustrative two-outlet water manifold assembly 600. Two-outlet water manifold assembly 600 is another example of an integrated valve and manifold assembly, described above. Whereas two-outlet dual-extrusion assembly 100 described in the previous section is configured for controlling the flow of air and water to a plurality of dual-extrusion ports, assembly 600 is configured for controlling the flow of water to a plurality of water ports. Assembly 600 may optionally be used in conjunction with a separate air control system. Some aspects of assembly 600 are substantially similar to aspects of assembly 100 and are accordingly not described in detail below.

FIG. 12 is an isometric view of assembly 600, and FIG. 13 is a sectional view of the assembly. As FIGS. 12-13 show, assembly 600 includes a two-way water valve 610 comprising a valve body 612 having an inlet 614, a first outlet 618, and a second outlet 622. First outlet 618 is coupled to, and in fluid communication with, a first end 628 of a water manifold 630. Second outlet 622 is coupled to, and in fluid communication with, a first end 632 of a second water manifold 634. First and second water manifolds 630, 634 may be substantially identical.

First and second water manifolds 630, 634 each include a water conduit 638 in fluid communication with a plurality of water ports 640. In the depicted example, manifolds 630, 634 each include six water ports, but any suitable number of ports may be provided on each manifold.

Water valve 610 includes a valve member 650 comprising a disc 654 mounted rigidly to a valve shaft 658. Rotating valve shaft 658 rotates disc 654 to selectively block or partially block first and second outlets 618, 622, as described above with respect to water valve 145. In the example depicted in FIG. 13, disc 654 is positioned to divert substantially all water entering valve body 612 at inlet 614 to second outlet 622.

Valve shaft 658 has a first end 662 rotatably coupled to a support rod 664 disposed within valve body 612, and a second end 670 coupled to an assembly top 674 coupled to a second end 680 of first manifold 630. Valve shaft 658 extends through first manifold 630.

Assembly top 674 comprises a plug 684 threadedly attached to second end 680 of first manifold 630. Valve shaft 658 extends through plug 684 and is rotatable within the plug. Plug 684 supports valve shaft 658 within assembly 600 such that the valve shaft does not tilt within the assembly, and seals first manifold 630 against water egress. A top portion 688 of valve shaft 658 protrudes from plug 684 (e.g., exterior to assembly top 674) and is configured to be attached to a knob or other suitable user interface to facilitate actuation of the valve by a user.

A second end 692 of second water manifold 634 terminates in a cap 694 configured to prevent water egress from the second end of the second water manifold. In some examples, second end 692 may be coupled to another plumbing component (e.g., a continuation pipe, an adapter, and/or the like) rather than to cap 694.

C. Illustrative One-Outlet Dual-Extrusion Assembly

With reference to FIGS. 14-18, this section describes an illustrative one-outlet dual-extrusion assembly 700. Assembly 700 is another example of an integrated valve and manifold assembly, described above. Assembly 700 includes at least one dual-extrusion manifold and is configured for controlling the flow of air and water to a plurality of dual-extrusion ports.

Figure 14:
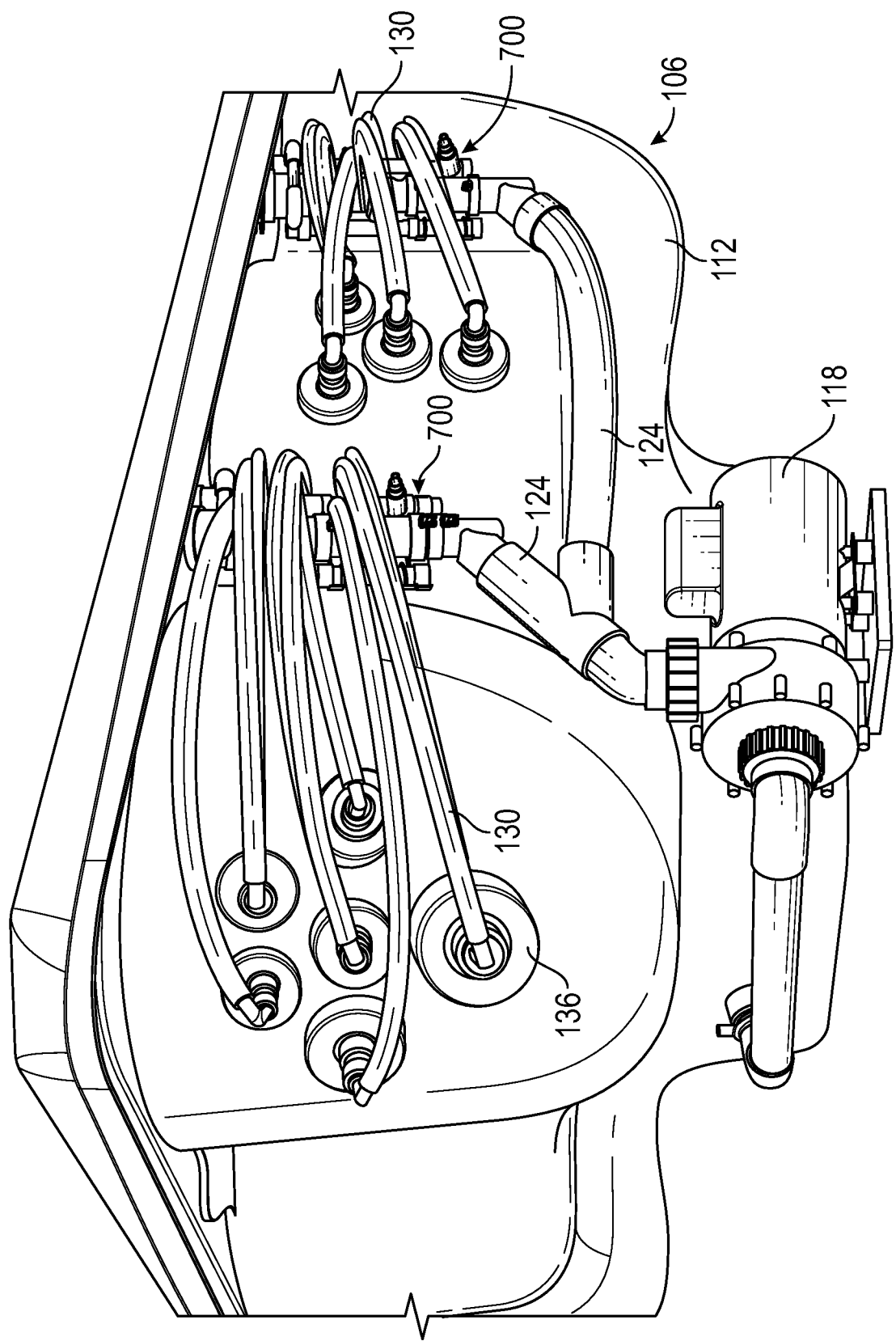
FIG. 14 is an isometric view of another illustrative hot-tub plumbing system including a pair of illustrative one-outlet dual-extrusion valve and manifold assemblies, in accordance with aspects of the present teachings.

FIG. 14 is an isometric view depicting two assemblies 700 installed within interior portion 106 of hot-tub shell 112. Water pump 118 delivers water to assemblies 700 via a pair of inlet hoses 124. Air is supplied to assemblies 700 directly or indirectly by an air blower or any other suitable air supply (not shown). Dual-extrusion tubes 130 deliver water and air from assemblies 700 to a plurality of jets 136.

Figure 15:
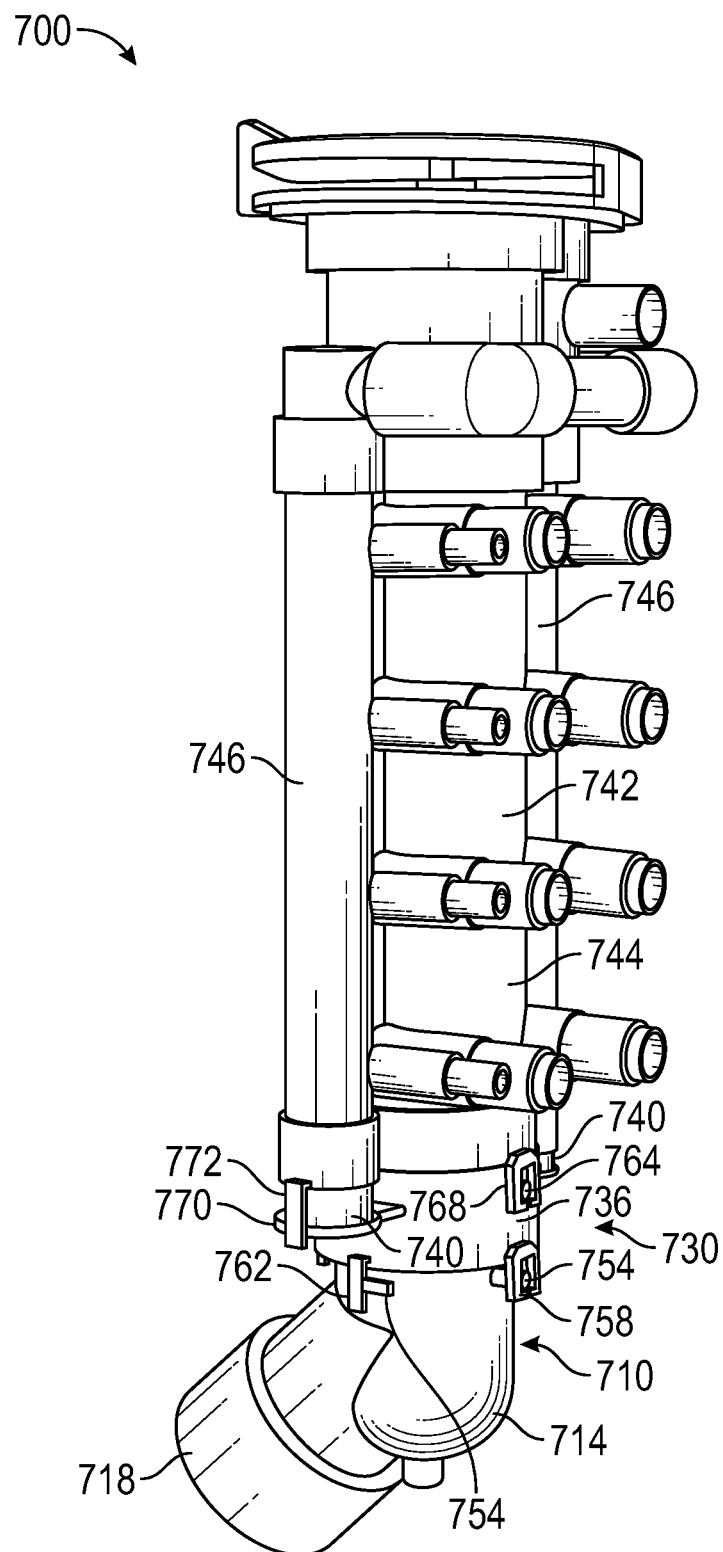
FIG. 15 is an isometric view of one of the one-outlet dual-extrusion valve and manifold assemblies of FIG. 14.
Figure 16:
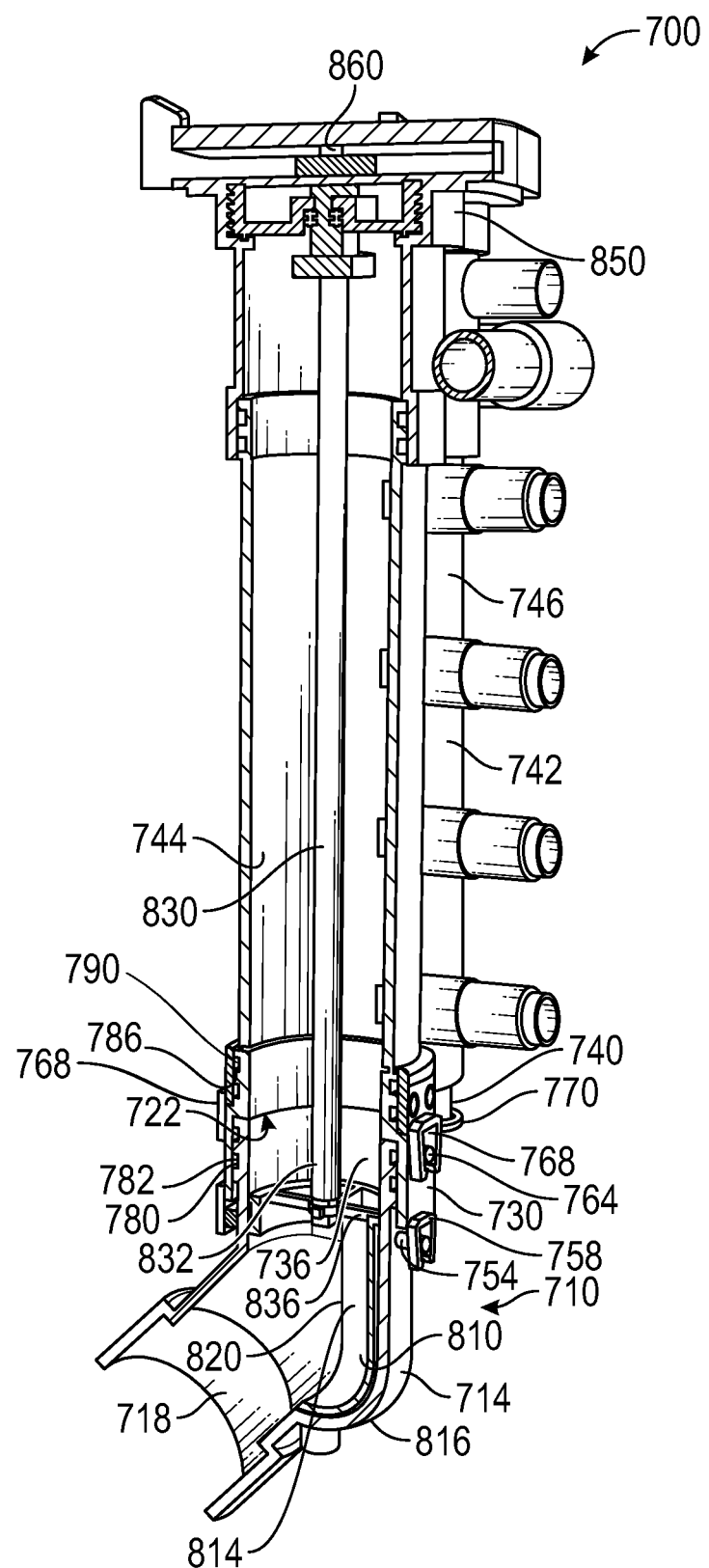
FIG. 16 is a sectional isometric view of the valve and manifold assembly of FIG. 15.

FIG. 15 is an isometric view of assembly 700, and FIG. 16 is a sectional view of the assembly. As FIGS. 15-16 show, assembly 700 includes a one-outlet valve 710 including a valve body 714 having an inlet 718 in fluid communication with an outlet 722. In normal operation, water enters valve body 714 at inlet 718 and exits the valve body at outlet 722.

Outlet 722 is coupled to, and in fluid communication with, a manifold coupler 730. Manifold coupler 730 includes a water conduit continuation 736 and a pair of air-channel caps 740. Manifold coupler 730 is configured to couple valve 710 to a dual-extrusion manifold 742, which may be substantially similar to dual-extrusion manifold 220, as in the depicted example. Water conduit continuation 736 couples valve body 714 to a manifold water conduit 744 and seals a pair of manifold air channels 746.

In the depicted example, valve body 714 has a plurality of protrusions 754, which may be substantially similar to protrusions 290. Manifold coupler 730 has plurality of hooks configured to engage protrusions 754. In the depicted example, the hooks include at least one two-armed spring-biased hook 758, which may be substantially similar to hook 294, and a single-armed spring-biased hook 762, which may be substantially similar to hook 304. In other examples, however, the manifold coupler and the valve body may be configured to couple together in any suitable way. In some examples, the coupler is integral with the valve.

Manifold coupler 730 has at least one protrusion 764 configured to engage a two-armed hook 768 of manifold 742. Air-channel caps 740 each include a flange 770 configured to engage a one-armed spring-biased hook 772 of a corresponding one of a pair of manifold air channels 746. In other examples, however, the manifold coupler may be configured to couple to the dual-extrusion manifold in any suitable manner. In some examples, the coupler is integral with the manifold (e.g., the manifold is configured to engage the valve directly).

Valve body 714 includes a plurality of grooves 780, and a respective O-ring 782 is disposed in each groove to facilitate a substantially watertight connection between the valve body and manifold coupler 730. Manifold coupler 730 includes a plurality of grooves 786 and a respective O-ring 790 disposed in each groove to facilitate a substantially watertight connection between the manifold coupler and manifold 742.

Figure 17:
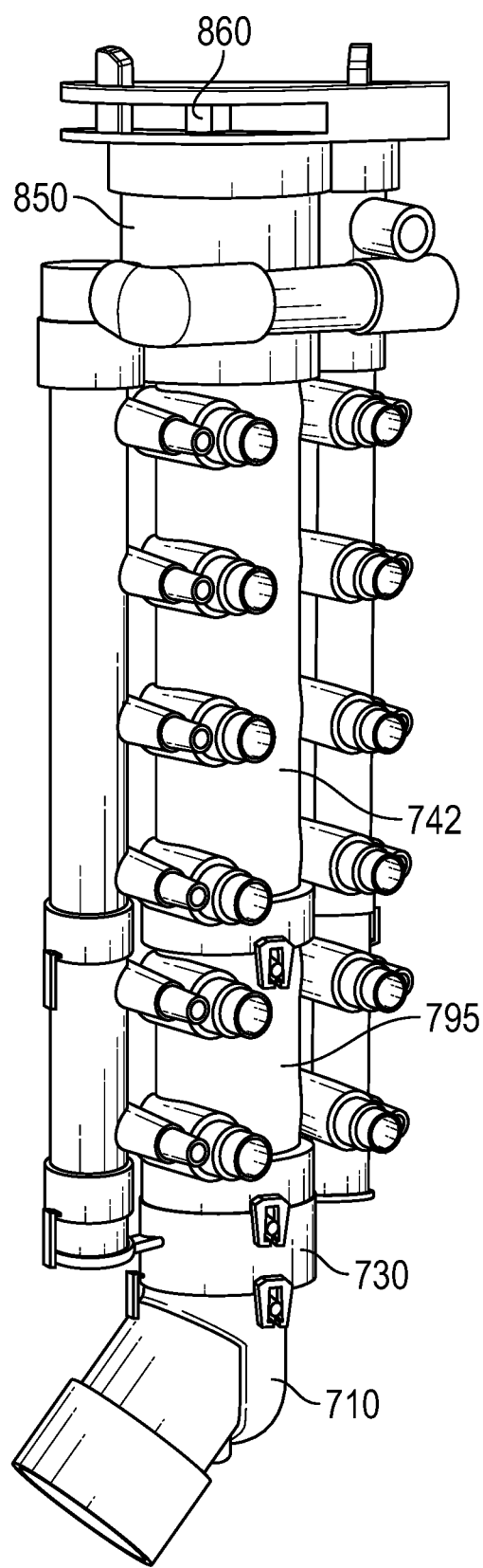
FIG. 17 is an isometric view of another illustrative one-outlet single-extrusion valve and manifold assembly in accordance with aspects of the present teachings.

In some examples, a first dual-extrusion manifold is coupled to manifold coupler 730, and a second dual-extrusion manifold is coupled to the first dual-extrusion manifold (e.g., by two-armed hooks and protrusions). FIG. 17 depicts an example wherein manifold coupler 730 is coupled to a four-port dual-extrusion manifold 795, which may be substantially similar to dual-extrusion manifold 225, and manifold 795 is coupled to manifold 742.

Figure 18:
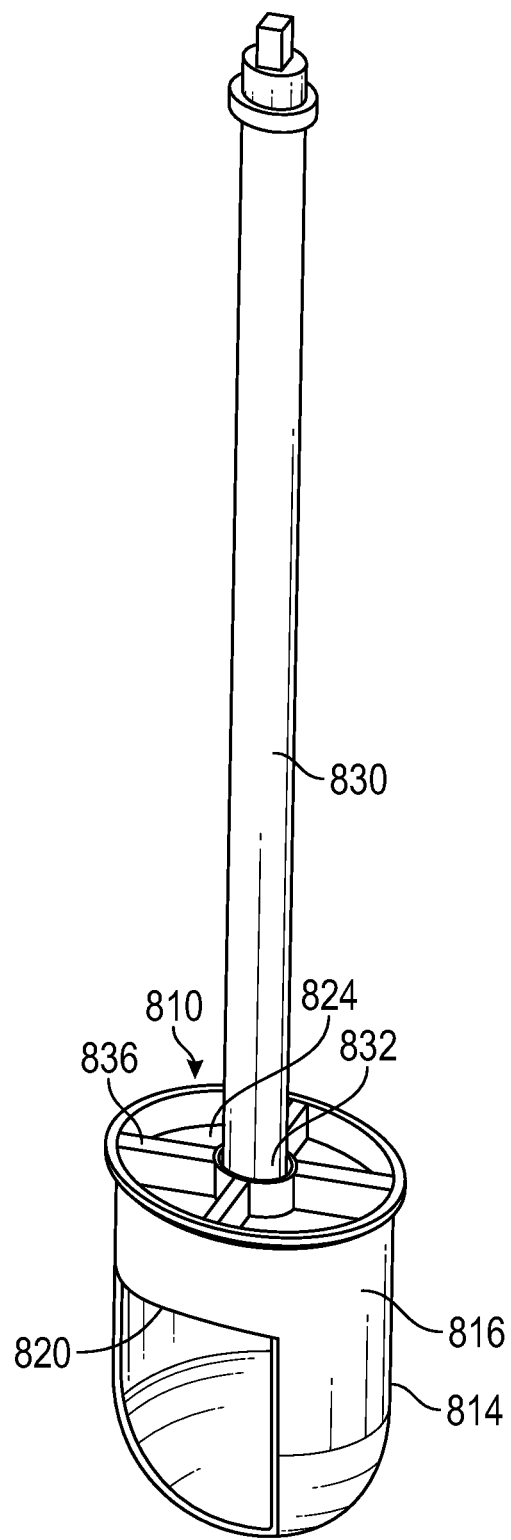
FIG. 18 is an isometric view of the water valve member of the valve and manifold assembly of FIG. 14.

Returning to FIGS. 15-16, valve 710 includes a valve member 810 disposed within valve body 714. FIG. 18 depicts valve member 810 without the valve body and manifold, for clarity. Valve member 810 is configured to control water flow between inlet 718 and outlet 722. Valve member 810 comprises a hollow plug 814 having a wall 816, a side opening 820, and a top opening 824 in fluid communication with the side opening. Plug 814 is sized and shaped to rotate within valve body 714. By rotation of plug 814 within valve body 714, side opening 820 may be selectively overlapped with inlet 718. Valve member 810 is rotatable between at least a first position, wherein substantially all of inlet 718 overlaps side opening 820, and a second position, wherein substantially none of inlet 718 overlaps side opening 820 (e.g., wherein the inlet is substantially completely obstructed by wall 816). In the depicted example, valve member 810 is further rotatable among a plurality or continuum of additional positions wherein a predetermined portion of inlet 718 overlaps side opening 820.

When a nonzero portion of inlet 718 overlaps side opening 820, water is able to pass from the inlet through the side opening into valve member 810, and to exit the valve member at top opening 824 to flow through manifold coupler 730 to manifold 742. The amount of water present at the inlet that is able to flow into valve member 810 depends on the size of the portion of inlet 718 that overlaps side opening 820. This size depends on the angular position of valve member 810 within valve body 714.

The angular position of valve member 810 selected by rotation of a valve shaft 830 rigidly attached at a first end 832 to the valve member. In the depicted example, valve shaft 830 is connected to a shaft support beam 836 extending across top opening 824 of valve member 810, but in other examples the shaft may connect to the valve member in any other suitable manner.

Assembly 700 includes an assembly top 850, which is substantially similar to assembly top 308 in at least some respects. Accordingly, assembly top 850 includes an air valve and an air coupler connecting an outlet of the air valve to air channels 746. A top portion 860 of valve shaft 830 protrudes from assembly top 850, and any suitable interface devices may be attached to top portion 860 and/or to a top portion of the air-valve shaft to facilitate operation of the valves.

D. Illustrative One-Outlet Single-Extrusion Assembly

Figure 19:
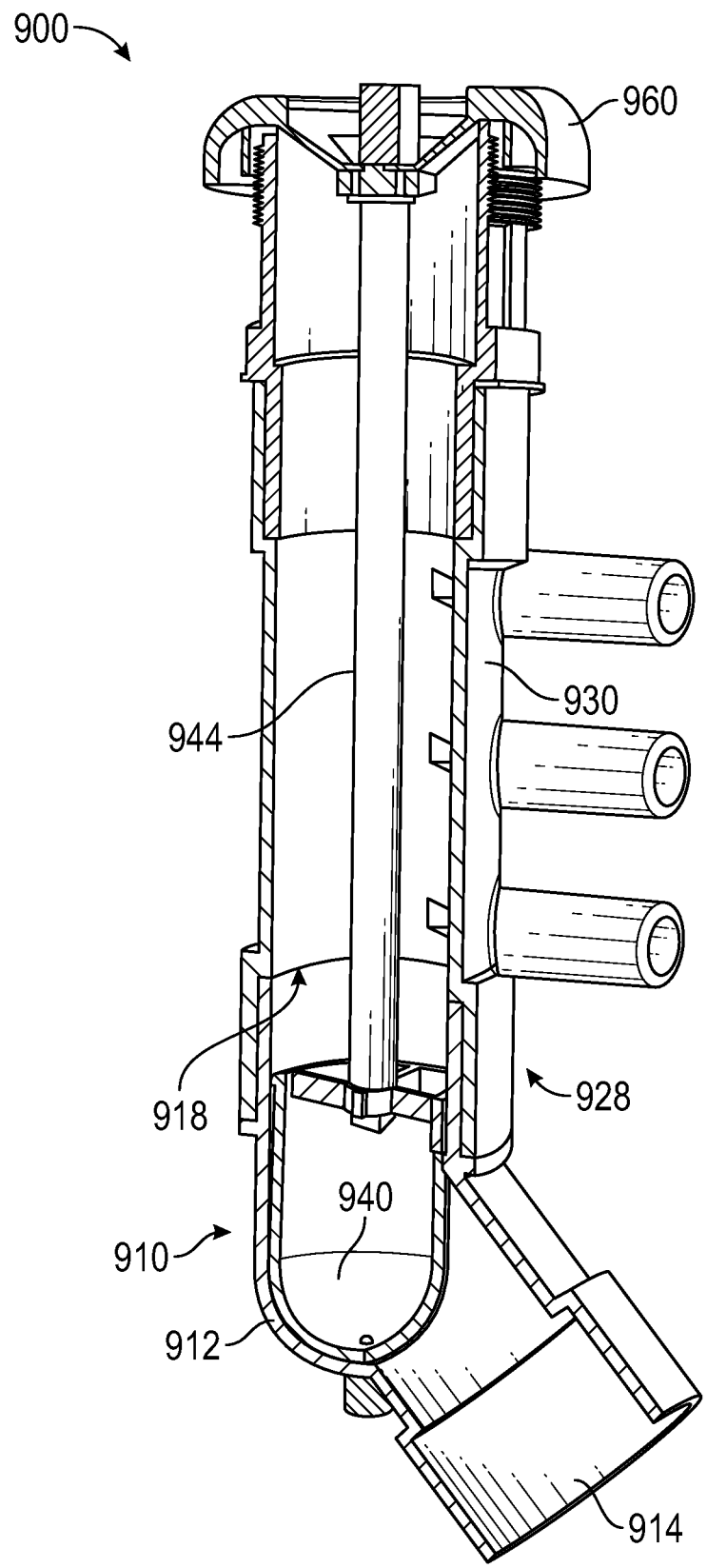
FIG. 19 is an isometric sectional view of yet another illustrative integrated valve and manifold assembly, comprising a one-outlet valve and a single-extrusion manifold, in accordance with aspects of the present teachings.

With reference to FIG. 19, this section describes an illustrative one-outlet single-extrusion assembly 900. Assembly 900 is another example of an integrated valve and manifold assembly, described above. Assembly 900 is configured for controlling the flow of water to a plurality of water ports, and may optionally be used in conjunction with a separate air control system.

FIG. 19 is a sectional view of assembly 900. As FIG. 19 shows, assembly 900 includes a one-outlet water valve 910, which may be substantially similar to water valve 710 in at least some respects. Accordingly, valve 910 comprises a valve body 912 having an inlet 914 and an outlet 918. Outlet 918 is coupled to, and in fluid communication with, a first end 928 of a water manifold 930, which may be substantially similar to water manifold 630.

In some examples, including the depicted example, assembly 900 does not include a manifold coupler like manifold coupler 730. Some purposes of manifold coupler 730, such as sealing ends of air channels of a dual-extrusion manifold, are not applicable to assembly 900. However, a manifold coupler may optionally be included in some examples of a one-outlet single-extrusion assembly.

Valve 910 includes a valve member 940 rigidly coupled to a valve shaft 944. Valve member 940 and valve shaft 944 are substantially similar to valve member 810 and valve shaft 830, respectively, and are operable in a similar manner.

Assembly 900 includes an assembly top 960, which is substantially similar to assembly top 674.

E. Illustrative Combinations and Additional Examples

This section describes additional aspects and features of integrated valve and manifold assemblies, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. An integrated valve and manifold assembly for a hot tub, the assembly comprising: a water valve including a water valve body having a water inlet and two water outlets, and a pair of air channels attached to the water valve body; a pair of dual-extrusion manifolds coupled to the water valve, each dual-extrusion manifold having a pair of manifold air channels each coupled to one of the air channels attached to the water valve body, and a water conduit coupled to one of the water outlets of the water valve body; and an assembly top comprising an air valve having an air inlet and an air outlet, and an air coupler coupling the air outlet to at least one of the manifold air channels.

A1. The assembly of paragraph A0, wherein the water valve comprises a disc rigidly attached to a first rotatable shaft at a nonperpendicular angle, such that the disc is rotatable between at least a first position, wherein the disc prevents fluid communication between the water inlet and a first one of the water outlets, and a second position, wherein the disc prevents fluid communication between the water inlet and a second one of the water outlets.

A2. The assembly of paragraph A1, wherein the disc is further rotatable to and from a plurality of intermediate positions wherein the disc diverts a first portion of a water stream entering the water valve body at the water inlet to the first outlet, and diverts a second portion of the water stream to the second outlet.

A3. The assembly of any one of paragraphs A1 through A2, wherein the first rotatable shaft extends at least partially through the water conduit of one of the dual-extrusion manifolds.

A4. The assembly of any one of paragraphs A1 through A3, wherein the air valve includes an air valve member having a wall portion and an open portion, and the air valve member is rigidly attached to a second rotatable shaft, such that the air valve member is rotatable between at least a first position wherein the wall portion overlaps the air inlet substantially completely and a second position wherein the open portion overlaps the air inlet substantially completely.

A5. The assembly of paragraph A4, wherein the air valve member is further rotatable to and from a plurality of intermediate positions wherein the wall portion partially overlaps the air inlet.

A6. The assembly of any one of paragraphs A4 through A5, wherein the first and second rotatable shafts are substantially parallel to each other and each extend to the assembly top.

A7. The assembly of any one of paragraphs A0 through A6, wherein the dual-extrusion manifolds are each coupled releasably to the water valve.

B0. An integrated valve and manifold assembly comprising: a water valve configured to selectively divert a first portion of a stream of water to a first outlet and a second portion of the stream of water to a second outlet; a first manifold comprising a first water conduit in fluid communication with a first water port, wherein a first end of the first water conduit is configured to couple to the first outlet of the water valve; and a second manifold comprising a second water conduit in fluid communication with a second water port, wherein a first end of the second water conduit is configured to couple to the second outlet of the water valve; wherein a water-valve actuator configured to actuate the water valve is disposed adjacent a second end of the first water conduit distal the first end of the first water conduit.

B1. The assembly of paragraph B0, wherein the first and second portions of the stream of water each comprise a nonzero amount of water.

B2. The assembly of any one of paragraphs B0 through B1, wherein the water valve includes a water-valve shaft rigidly connected at a first end to the water-valve actuator and rigidly connected at a second end to a disc configured to selectively divert the first and second portions of the stream of water.

B3. The assembly of any one of paragraphs B0 through B2, wherein the first manifold includes a first air channel externally connected to the first water conduit, the second manifold includes a second air channel externally connected to the second water conduit, and the water valve includes a third air channel configured to couple the first air channel to the second air channel.

B4. The assembly of paragraph B3, further comprising an air valve configured to control a flow of air through an air outlet coupled to the first air channel.

B5. The assembly of paragraph B4, further comprising an air-valve actuator configured to actuate the air valve, and wherein the air-valve actuator is disposed adjacent the water-valve actuator.

C0. An integrated valve and manifold assembly comprising: a water valve including a water-valve member configured to control an amount of water exiting the valve at a first water-valve outlet; a water-valve shaft rigidly coupled to the water-valve member; and a first manifold including a first water conduit coupled to the first water-valve outlet; wherein the water-valve shaft is disposed at least partially within the first water conduit.

C1. The assembly of paragraph C0, wherein the water valve further comprises a second water-valve outlet, and the water-valve member is further configured to control an amount of water exiting the valve at the second water-valve outlet.

C2. The assembly of paragraph C1, wherein the second water-valve outlet is coupled to a second manifold.

C3. The assembly of paragraph C1, wherein the second water-valve outlet is coupled to a pipe continuation.

C4. The assembly of any one of paragraphs C0 through C3, wherein the first manifold further comprises a first air channel, and the assembly further comprises an air valve configured to control a flow of air into the first air channel.

C5. The assembly of paragraph C4, wherein the air valve includes an air inlet and an air-valve member having a wall portion configured to selectively overlap at least a portion of the air inlet based on an angular position of the air-valve member.

Advantages, Features, and Benefits

The different embodiments and examples of the integrated valve and manifold assemblies described herein provide several advantages over known solutions for providing controllable flow(s) of water and/or air to a hot tub or other suitable device. For example, illustrative embodiments and examples described herein integrate control valves with a manifold body, thereby eliminating the need for pipes and fittings to connect the valves to the manifold. Accordingly, the time and cost of manufacturing and installing such pipes and fittings is avoided. Furthermore, reducing the number of connections tends to reduce the number of potential failure points in the system (e.g., points at which the system is prone to leak and/or operate inefficiently), and accordingly tends to reduce the frequency of system malfunctions.

Additionally, and among other benefits, illustrative embodiments and examples described herein allow a valve assembly to be easily installed in a position and orientation within the hot-tub shell that allows an actuator of the valve (e.g., a knob, tab, button, and/or the like) to be easily accessible to an occupant or other user of the hot tub.

Additionally, and among other benefits, illustrative embodiments and examples described herein allow a hot-tub valve and manifold assembly including pipes having less length and/or fewer turns (e.g., curved portions) than conventional assemblies. This may simplify installation and maintenance and improve the efficiencies and/or performances of water and/or air circuits. Improving efficiency and/or performance may allow for additional jets to be added to a system that includes a standard size water pump, resulting in an enhanced spa and/or therapy system. Additionally, or alternatively, improving efficiency and/or performance may allow for maintaining a standard number of jets in a system having a smaller pump, reducing the cost of making and operating the system.

Additionally, and among other benefits, illustrative embodiments and examples described herein allow a water and/or air plumbing system that occupies less space within a hot-tub shell than conventional systems. This allows more freedom in the design of the shell.

Additionally, and among other benefits, illustrative embodiments and examples described herein allow an air valve assembly to be integrated into the water valve assembly. This tends to reduce cost and to improve the ease of use of the system, as an operator can control the air and water systems from the same location (e.g., from a pair of adjacent knobs).

Additionally, and among other benefits, illustrative embodiments and examples described herein allow valve control(s) for air and/or water systems to be integrated into an assembly including any of a plurality of manifold combinations (e.g., any suitable combination of two-port, four-port, six-port, and/or eight-port manifolds, or any other suitable types of manifolds and/or pipe couplers and/or pipes, at any suitable port of the valve assembly). This allows flexibility in plumbing system and therapy seat design (e.g., with respect to a selected number and/or placement of jets).

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An integrated valve and manifold assembly for a hot tub, the assembly comprising:
   a water valve including a water valve body having a water inlet and two water outlets, and a pair of air channels attached to the water valve body;
   a pair of dual-extrusion manifolds coupled to the water valve, each dual-extrusion manifold having a pair of manifold air channels each coupled to one of the air channels attached to the water valve body, and a water conduit coupled to one of the water outlets of the water valve body; and
   an assembly top comprising an air valve having an air inlet and an air outlet, and an air coupler coupling the air outlet to at least one of the manifold air channels.

2. The assembly of claim 1, wherein the water valve comprises a disc rigidly attached to a first rotatable shaft at a nonperpendicular angle, such that the disc is rotatable between at least a first position, wherein the disc prevents fluid communication between the water inlet and a first one of the water outlets, and a second position, wherein the disc prevents fluid communication between the water inlet and a second one of the water outlets.

3. The assembly of claim 2, wherein the disc is further rotatable to and from a plurality of intermediate positions wherein the disc diverts a first portion of a water stream entering the water valve body at the water inlet to the first outlet, and diverts a second portion of the water stream to the second outlet.

4. The assembly of claim 2, wherein the first rotatable shaft extends at least partially through the water conduit of one of the dual-extrusion manifolds.

5. The assembly of claim 2, wherein the air valve includes an air valve member having a wall portion and an open portion, and the air valve member is rigidly attached to a second rotatable shaft, such that the air valve member is rotatable between at least a first position wherein the wall portion overlaps the air inlet substantially completely and a second position wherein the open portion overlaps the air inlet substantially completely.

6. The assembly of claim 5, wherein the air valve member is further rotatable to and from a plurality of intermediate positions wherein the wall portion partially overlaps the air inlet.

7. The assembly of claim 5, wherein the first and second rotatable shafts are substantially parallel to each other and each extend to the assembly top.

8. The assembly of claim 1, wherein the dual-extrusion manifolds are each coupled releasably to the water valve.

9. An integrated valve and manifold assembly comprising:
   a water valve configured to selectively divert a first portion of a stream of water to a first outlet and a second portion of the stream of water to a second outlet;
   a first manifold comprising a first water conduit in fluid communication with a first water port, wherein a first end of the first water conduit is configured to couple to the first outlet of the water valve; and
   a second manifold comprising a second water conduit in fluid communication with a second water port, wherein a first end of the second water conduit is configured to couple to the second outlet of the water valve;
   wherein a water-valve actuator configured to actuate the water valve is disposed adjacent a second end of the first water conduit distal the first end of the first water conduit, the first manifold includes a first air channel externally connected to the first water conduit, the second manifold includes a second air channel externally connected to the second water conduit, and the water valve includes a third air channel configured to couple the first air channel to the second air channel.

10. The assembly of claim 9, wherein the first and second portions of the stream of water each comprise a nonzero amount of water.

11. The assembly of claim 9, wherein the water valve includes a water-valve shaft rigidly connected at a first end to the water-valve actuator and rigidly connected at a second end to a disc configured to selectively divert the first and second portions of the stream of water.

12. The assembly of claim 9, further comprising an air valve configured to control a flow of air through an air outlet coupled to the first air channel.

13. The assembly of claim 12, further comprising an air-valve actuator configured to actuate the air valve, and wherein the air-valve actuator is disposed adjacent the water-valve actuator.

* * * * *